(12) United States Patent
Li et al.

(10) Patent No.: US 12,550,177 B2
(45) Date of Patent: Feb. 10, 2026

(54) SCHEDULING MULTI-USER MULTIPLE-INPUT MULTIPLE-OUTPUT TRANSMISSIONS TO A CO-SCHEDULED SET OF USER EQUIPMENT FROM AN ANTENNA ARRAY COMPRISING MULTIPLE PANELS

(71) Applicant: QUALCOMM Incorporated, San Diego, CA (US)

(72) Inventors: Wenjun Li, Basking Ridge, NJ (US); Meilong Jiang, Westfield, NJ (US); Vishnu Kaimal, Princeton, NJ (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 18/184,434

(22) Filed: Mar. 15, 2023

(65) Prior Publication Data
US 2024/0323993 A1    Sep. 26, 2024

(51) Int. Cl.
*H04B 7/08* (2006.01)
*H04B 7/0452* (2017.01)
(Continued)

(52) U.S. Cl.
CPC ........ *H04W 72/542* (2023.01); *H04B 7/0452* (2013.01); *H04W 72/12* (2013.01)

(58) Field of Classification Search
CPC .............. H04B 7/0452; H04B 7/0632; H04B 7/06956; H04W 72/12; H04W 72/121; H04W 72/542
See application file for complete search history.

(56) References Cited

U.S. PATENT DOCUMENTS

| 2015/0282122 | A1* | 10/2015 | Kim | H04B 7/0639 370/329 |
| 2021/0321423 | A1* | 10/2021 | Kuchi | H04W 72/51 |
| 2023/0246700 | A1* | 8/2023 | Chen | H04B 7/0695 370/329 |

FOREIGN PATENT DOCUMENTS

CN    115801069 A    3/2023

OTHER PUBLICATIONS

International Search Report and Written Opinion—PCT/US2024/014774—ISA/EPO—May 16, 2024 (2208726WO).
(Continued)

*Primary Examiner* — Phuc H Tran
(74) *Attorney, Agent, or Firm* — Holland & Hart LLP

(57) ABSTRACT

An apparatus, at a network entity, for scheduling multi-user multiple-input multiple-output (MU-MIMO) transmissions to a co-scheduled set of user equipment (UEs) from an antenna array comprising multiple panels is disclosed. The apparatus comprises: a processor; a memory communicatively coupled to the processor; and executable instructions code stored in the memory, which when executed by the processor, cause the processor to: determine a reduced set of entries of panel-to-UE assignment from among multiple combinations of panel-to-UE assignment; and select, from within the reduced set, an entry of the panel-to-UE assignment for scheduling, based on a proportionately fair (PF) metric, wherein a panel-to-UE assignment is a mapping of the panels assigned to transmit to a selection of the UEs using associated serving beams configured for transmission to the respective UEs.

30 Claims, 11 Drawing Sheets

(51) Int. Cl.
*H04W 72/12* (2023.01)
*H04W 72/542* (2023.01)

(56) References Cited

OTHER PUBLICATIONS

Vook F.W., et al., "Performance Characteristics of 5G mmWave Wireless-To-The-Home", 2016 50th Asilomar Conference on Signals, Systems and Computers, IEEE, Nov. 6, 2016, XP033072789, pp. 1181-1185, Sections II, III, p. 1182-p. 1184, Table 1 Figures 1, 3.

* cited by examiner

| | Panel 1 | Panel 2 | Panel 3 | Panel 4 | Freq |
|---|---|---|---|---|---|
| 1 | 4 | 4 | 4 | 4 | 36.43 | ~602a
| 2 | 3 | 3 | 3 | 3 | 15.94 |
| 3 | 1 | 2 | 3 | 3 | 8.87 |
| 4 | 1 | 1 | 2 | 2 | 8.58 | ~604
| 5 | 2 | 2 | 2 | 2 | 5.23 |
| 6 | 1 | 2 | 4 | 4 | 3.80 |
| 7 | 1 | 2 | 2 | 2 | 3.56 |
| 8 | 1 | 3 | 3 | 3 | 2.35 | ~602b
| 9 | 1 | 2 | 2 | 3 | 2.17 |
| 10 | 1 | 1 | 3 | 3 | 1.83 |
| 11 | 1 | 1 | 1 | 1 | 1.75 |
| 12 | 1 | 1 | 4 | 4 | 1.63 |
| 13 | 2 | 2 | 3 | 3 | 1.50 |
| 14 | 2 | 2 | 4 | 4 | 1.24 |
| 15 | 3 | 3 | 4 | 4 | 0.93 |
| 16 | 1 | 2 | 2 | 4 | 0.75 | ~602c Top 8: 84.76547341364392
Top 16: 96.56336453121806   ~606

FIG. 6a

| | Panel 1 | Panel 2 | Panel 3 | Panel 4 | Freq |
|---|---|---|---|---|---|
| 1 | 1 | 2 | 3 | 4 | 23.89 |
| 2 | 2 | 3 | 3 | 4 | 9.63 |
| 3 | 2 | 3 | 3 | 4 | 9.46 |
| 4 | 1 | 3 | 4 | 4 | 6.48 |
| 5 | 2 | 2 | 3 | 4 | 6.31 |
| 6 | 1 | 3 | 3 | 4 | 6.19 |
| 7 | 1 | 1 | 3 | 4 | 5.02 |
| 8 | 1 | 2 | 4 | 4 | 4.32 |
| 9 | 1 | 2 | 3 | 3 | 4.09 |
| 10 | 1 | 2 | 2 | 3 | 3.74 |
| 11 | 3 | 4 | 4 | 4 | 3.19 |
| 12 | 1 | 1 | 2 | 4 | 2.74 |
| 13 | 2 | 4 | 4 | 4 | 2.26 |
| 14 | 1 | 2 | 2 | 4 | 2.14 |
| 15 | 3 | 4 | 4 | 4 | 1.79 |
| 16 | 3 | 3 | 4 | 4 | 1.59 |

Top 8: 71.30704519222232
Top 16: 92.81663411169316

FIG. 6b

| | Panel 1 | Panel 2 | Panel 3 | Panel 4 | Freq |
|---|---|---|---|---|---|
| 1 | 4 | 4 | 4 | 4 | 35.13 |
| 2 | 3 | 3 | 3 | 3 | 17.99 |
| 3 | 1 | 1 | 2 | 2 | 8.73 |
| 4 | 2 | 2 | 2 | 2 | 6.56 |
| 5 | 1 | 2 | 3 | 3 | 6.31 |
| 6 | 1 | 2 | 2 | 2 | 5.50 |
| 7 | 1 | 3 | 3 | 3 | 3.60 |
| 8 | 1 | 2 | 4 | 4 | 3.27 |
| 9 | 1 | 1 | 1 | 1 | 2.69 |
| 10 | 1 | 1 | 3 | 3 | 2.11 |
| 11 | 1 | 1 | 4 | 4 | 1.96 |
| 12 | 2 | 2 | 2 | 3 | 1.92 |
| 13 | 1 | 2 | 2 | 3 | 1.81 |
| 14 | 2 | 2 | 4 | 4 | 1.31 |
| 15 | 3 | 3 | 4 | 4 | 1.11 |
| 16 | 1 | 2 | 3 | 4 | 0.02 |

Top 8: 87.080933331629098
Top 16: 99.999999999999

*FIG. 7a*

| | Panel 1 | Panel 2 | Panel 3 | Panel 4 | Freq |
|---|---|---|---|---|---|
| 1 | 1 | 2 | 3 | 4 | 28.29 |
| 2 | 1 | 2 | 3 | 3 | 14.31 |
| 3 | 1 | 2 | 2 | 3 | 9.97 |
| 4 | 1 | 2 | 4 | 4 | 9.10 |
| 5 | 2 | 3 | 4 | 4 | 6.99 |
| 6 | 2 | 3 | 3 | 4 | 6.77 |
| 7 | 1 | 3 | 4 | 4 | 5.68 |
| 8 | 1 | 3 | 3 | 4 | 4.44 |
| 9 | 1 | 1 | 2 | 4 | 3.79 |
| 10 | 3 | 4 | 4 | 4 | 3.00 |
| 11 | 4 | 4 | 4 | 4 | 2.48 |
| 12 | 1 | 2 | 3 | 4 | 2.26 |
| 13 | 2 | 3 | 3 | 4 | 1.95 |
| 14 | 3 | 3 | 3 | 3 | 0.85 |
| 15 | 2 | 2 | 2 | 2 | 0.12 |
| 16 | 1 | 1 | 1 | 1 | 0.02 |

Top 8: 85.5403310745 0171
Top 16: 100.0

*FIG. 7b*

| | Panel 1 | Panel 2 | Panel 3 | Panel 4 | Freq |
|---|---|---|---|---|---|
| 1 | 4 | 4 | 4 | 4 | 36.34 |
| 2 | 3 | 3 | 3 | 3 | 20.19 |
| 3 | 1 | 1 | 2 | 2 | 16.12 |
| 4 | 1 | 2 | 3 | 3 | 11.23 |
| 5 | 2 | 2 | 2 | 2 | 8.32 |
| 6 | 1 | 2 | 4 | 4 | 4.47 |
| 7 | 1 | 1 | 1 | 1 | 3.30 |
| 8 | 1 | 2 | 3 | 4 | 0.04 |

Top 8: 99.99999999999999
Top 16: 99.99999999999999

*FIG. 8a*

| | Panel 1 | Panel 2 | Panel 3 | Panel 4 | Freq |
|---|---|---|---|---|---|
| 1 | 1 | 1 | 3 | 4 | 57.65 |
| 2 | 2 | 2 | 4 | 4 | 15.41 |
| 3 | 1 | 3 | 3 | 4 | 10.27 |
| 4 | 2 | 3 | 3 | 4 | 8.59 |
| 5 | 4 | 4 | 4 | 4 | 4.59 |
| 6 | 3 | 3 | 3 | 3 | 2.71 |
| 7 | 2 | 2 | 2 | 2 | 0.61 |
| 8 | 1 | 1 | 1 | 1 | 0.18 |

Top 8: 100.0
Top 16: 100.0

*FIG. 8b*

SCHEDULING MULTI-USER MULTIPLE-INPUT MULTIPLE-OUTPUT TRANSMISSIONS TO A CO-SCHEDULED SET OF USER EQUIPMENT FROM AN ANTENNA ARRAY COMPRISING MULTIPLE PANELS

TECHNICAL FIELD

The following relates generally to wireless communications, and more specifically to scheduling multi-user multiple-input multiple-output (MU-MIMO) transmissions, at a network entity, to a co-scheduled set of user equipment (UEs) from an antenna array having multiple panels.

BACKGROUND

Implementation of first generation millimeter wave (mmW) systems are typically based on analog-beamforming (ABF) techniques, in which high-resolution codebooks used are associated with high beam management overheads. Such systems are also typically configured only for single-user (SU) mode, and that next-generation NodeBs or giga-NodeBs (e.g. both may be referred to as gNBs), and user equipment (UEs) used within the systems are limited to operating with a spatial degrees of freedom of 2 (i.e. 2 radio chains, with 1 radio chain per polarization).

On the other hand, the next-generation communication systems, configured to use higher frequency bands, have massive panel-arrays which allow and necessitate utilizing a combination of hybrid-beamforming and multi-user multiple-input multiple-output (MU-MIMO) techniques to maximize system performance. Conventional single user scheduling algorithms (e.g. greedy and K-best) typically involve ordering UEs using the proportionally fair (PF) metric for assigning to a co-scheduled set, and then iteratively adding new UEs to the co-scheduled set to ensure either sufficient low channel correlation, or sufficient analog beam separation.

These algorithms however do not work well for a panel-based spatial MU-MIMO system with practical-size codebooks, where the UEs need to be separated by both analog and digital precoding. The system requires the selection of the UEs, and the assignment of the analog beams on each of the panels to be jointly optimized to maximize the sum of the PF metric, which could be accomplished, e.g. using a brute-force search solution that however tend to have an exponential complexity vis-à-vis the number of panels in the system. Such a solution is therefore prohibitive in practical implementations.

So, there is a need for a solution that may address at least one of the problems of the prior art (as discussed above) and/or to provide a choice that is useful in the art.

SUMMARY

The described techniques herein may relate to scheduling multi-user multiple-input multiple-output (MU-MIMO) transmissions, at a network entity, to a co-scheduled set of user equipment (UEs) from an antenna array comprising multiple panels. Each panel may be configured with 2 digitally controlled radio-frequency (RF) chains. The network entity and the UEs are configured for 3G, 4G, new radio (e.g. 5G NR) wireless technologies, and/or other types of radio-based wireless technologies (e.g. IEEE 802.11x protocol family). As stated, the network entity is to be configured with an antenna array to thereby support the said scheduling.

According to a $1^{st}$ aspect, there is disclosed an apparatus, at a network entity, for scheduling multi-user multiple-input multiple-output (MU-MIMO) transmissions to a co-scheduled set of user equipment (UEs) from an antenna array comprising multiple panels, comprising: a processor; a memory communicatively coupled to the processor; and executable instructions code stored in the memory, which when executed by the processor, cause the processor to: determine a reduced set of entries of panel-to-UE assignment from among multiple combinations of panel-to-UE assignment; and select, from within the reduced set, an entry of the panel-to-UE assignment for scheduling, based on a proportionately fair (PF) metric. A panel-to-UE assignment is a mapping of the panels assigned to transmit to a selection of the UEs using associated serving beams configured for transmission to the respective UEs.

In an example, to select the entry of the panel-to-UE assignment for scheduling may comprise to: compute PF metrics for the respective entries in the reduced set of the panel-to-UE assignment; select, from the reduced set, an entry having a maximum value for the computed PF metric as the selected entry of the panel-to-UE assignment for scheduling; and schedule, based on the selected entry, a MU-MIMO transmission in a next transmission time interval (TTI).

In an example, to compute the PF metrics for the respective entries in the reduced set may comprise to: perform, for each entry in the reduced set, the following steps: compute, based on estimated wideband instantaneous throughput and average throughput for each UE in the entry, PF metrics for the respective UEs in the entry; and sum the respective computed PF metrics to obtain a summed PF metric for the entry. The summed PF metric may be expressed as: SumPF=$\Sigma_i$PF(i), wherein SumPF is the summed PF metric, and PF(i) is the computed PF metric for the i-th UE.

Each entry is a joint assignment/mapping of the respective panels to the respective UEs for scheduling MU-MIMO transmissions thereto. Not all UEs that may seek transmission are included in all entries. At least one entry may include all the UEs that may seek transmission, although it need always not be the case, especially if a number of UEs to be served by the network entity is much more than the number of panels arranged on the antenna array. In a typical example, some entries have just one UE, with all panels assigned to that UE. Typically there is one such entry for each UE. In a typical example, most entries have panels assigned to more than one UE and less than all the UEs. Hence, reference to "each UE in an entry" refers to each of those UEs for which a given entry has panel-to-UE assignment.

In an example, to compute the PF metrics for the respective UEs in the entry of the panel-to-UE assignment may include to compute a PF metric of a UE based on the equation:

$$PF(i) = \frac{R_i^\alpha}{\overline{R}_i^\beta},$$

wherein PF(i) is the PF metric of the i-th UE, $R_i^\alpha$ is an estimated instantaneous throughput for the i-th UE, $\overline{R}_i$ is an average throughput of the i-th UE, and $\alpha$ and $\beta$ are parameters configured to tradeoff between fairness and the average throughput. α and β may be configured with a default value of 1.

In an example, the executable instructions code, when executed by the processor, may further cause the processor to: determine, for each entry in the reduced set, respective representations of a full radio channel at respective UEs in the entry to thereby obtain respective precoded composite channel representations at the respective UEs in the entry. The determinations are based on the panel-to-UE assignment associated with the entry, the associated serving beams configured for the respective UEs in the entry, and a digital precoder selected for the respective UEs in the entry configured to maximize signal strength and mitigate inter-UE interference.

In an example, the executable instructions code, when executed by the processor, may further cause the processor to: compute, for each entry in the reduced set, channel quality indicators associated with respective data streams to be transmitted by the respective serving beams, wherein the computation is based at least on the precoded composite channel representations; and wherein the estimated wideband instantaneous throughput are computed based on the computed channel quality indicators.

In an example, the executable instructions code, when executed by the processor, may further cause the processor to: perform, for each entry in the reduced set, rank adaption for ranks of the respective UEs in the entry, which is made based on the assignment of the panels in the entry.

In an example, to determine the reduced set of entries of the panel-to-UE assignment may include to predetermine the reduced set of entries of the panel-to-UE assignment based on computer simulations.

In an example, the executable instructions code, when executed by the processor, may further cause the processor to: order, based on indexes, the UEs in descending order, wherein the indexes are generated based on reference signals received power (RSRP) detected at the respective UEs, or based on measurement of respective sounding reference signals (SRS) from the respective UEs.

In an example, the executable instructions code, when executed by the processor, may further cause the processor to: order, based on indexes, the UEs in ascending order, wherein the indexes are generated based on individual UE PF metrics computed for the respective UEs configured under single-user (SU) transmission.

In an example, the executable instructions code, when executed by the processor, may further cause the processor to: perform, prior to the selection, channel sounding for each UE in the set of UEs, which includes: performing, for each serving beam of serving beams of the associated serving beams configured for transmission to the respective UEs, the following step: receiving, from the set of UEs, respective sounding reference signals (SRSs) transmitted on an associated SRS resource.

In an example, the respective SRSs may be transmitted by the respective UEs on respective different frequency resources.

According to a 2$^{nd}$ aspect, there is disclosed a method performed, at a network entity, for scheduling multi-user multiple-input multiple-output (MU-MIMO) transmissions to a co-scheduled set of user equipment (UEs) from an antenna array comprising multiple panels, comprising: determining a reduced set of entries of panel-to-UE assignment from among multiple combinations of panel-to-UE assignment; and selecting, from within the reduced set, an entry of the panel-to-UE assignment for scheduling, based on a proportionately fair (PF) metric. A panel-to-UE assignment is a mapping of the panels assigned to transmit to a selection of the UEs using associated serving beams configured for transmission to the respective UEs.

In an example, selecting the entry of the panel-to-UE assignment for scheduling may comprise: computing PF metrics for the respective entries in the reduced set of the panel-to-UE assignment; selecting, from the reduced set, an entry having a maximum value for the computed PF metric as the selected entry of the panel-to-UE assignment for scheduling; and scheduling, based on the selected entry, a MU-MIMO transmission in a next transmission time interval (TTI).

In an example, computing the PF metrics for the respective entries in the reduced set may comprise: performing, for each entry in the reduced set, the following steps: computing, based on estimated wideband instantaneous throughput and average throughput for each UE in the entry, PF metrics for the respective UEs in the entry; and summing the respective computed PF metrics to obtain a summed PF metric for the entry, based on: SumPF=$\Sigma_i$PF(i), wherein SumPF is the summed PF metric, and PF(i) is the computed PF metric for the i-th UE.

In an example, computing the PF metrics for the respective UEs in the entry of the panel-to-UE assignment may include computing a PF metric of a UE based on the equation:

$$PF(i) = \frac{R_i^\alpha}{\overline{R}_i^\beta},$$

wherein PF(i) is the PF metric of the i-th UE, $\overline{R}_i^\alpha$ is an estimated instantaneous throughput for the i-th UE, $\overline{R}_i$ is an average throughput of the i-th UE, and α and β are parameters configured to tradeoff between fairness and the average throughput. α and β may be configured with a default value of 1.

In an example, the method may further comprise: determining, for each entry in the reduced set, respective representations of a full radio channel at respective UEs in the entry to thereby obtain respective precoded composite channel representations at the respective UEs in the entry. The determinations are based on the panel-to-UE assignment associated with the entry, the associated serving beams configured for the respective UEs in the entry, and a digital precoder selected for the respective UEs in the entry configured to maximize signal strength and mitigate inter-UE interference.

In an example, the method may further comprise: computing, for each entry in the reduced set, channel quality indicators associated with respective data streams to be transmitted by the respective serving beams, wherein the computation is based at least on the precoded composite channel representations; and wherein the estimated wideband instantaneous throughput are computed based on the computed channel quality indicators.

In an example, the method may further comprise: performing, for each entry in the reduced set, rank adaption for ranks of the respective UEs in the entry, which is made based on the assignment of the panels in the entry.

In an example, determining the reduced set of entries of the panel-to-UE assignment may include predetermining the reduced set of entries of the panel-to-UE assignment based on computer simulations.

In an example, the method may further comprise: ordering, based on indexes, the UEs in descending order, wherein the indexes are generated based on reference signals received power (RSRP) detected at the respective UEs, or based on measurement of respective sounding reference signals (SRS) from the respective UEs.

In an example, the method may further comprise: ordering, based on indexes, the UEs in ascending order, wherein the indexes are generated based on individual UE PF metrics computed for the respective UEs configured under single-user (SU) transmission.

In an example, the method may further comprise: performing, prior to the selection, channel sounding for each UE in the set of UEs, which includes: performing, for each serving beam of the associated serving beams configured for transmission to the respective UEs, the following step: receiving, from the set of UEs, respective sounding reference signals (SRSs) transmitted on an associated SRS resource.

In an example, the respective SRSs may be transmitted by the respective UEs on respective different frequency resources.

According to a $3^{rd}$ aspect, there is disclosed an apparatus, at a network entity, for scheduling multi-user multiple-input multiple-output (MU-MIMO) transmissions to a co-scheduled set of user equipment (UEs) from an antenna array comprising multiple panels, comprising: means for determining a reduced set of entries of panel-to-UE assignment from among multiple combinations of panel-to-UE assignment; and means for selecting, from within the reduced set, an entry of the panel-to-UE assignment for scheduling, based on a proportionately fair (PF) metric. A panel-to-UE assignment is a mapping of the panels assigned to transmit to a selection of the UEs using associated serving beams configured for transmission to the respective UEs.

In an example, the means for selecting the entry of the panel-to-UE assignment for scheduling may comprise: means for computing PF metrics for the respective entries in the reduced set of the panel-to-UE assignment; means for selecting, from the reduced set, an entry having a maximum value for the computed PF metric as the selected entry of the panel-to-UE assignment for scheduling; and means for scheduling, based on the selected entry, a MU-MIMO transmission in a next transmission time interval (TTI).

In an example, the means for computing the PF metrics for the respective entries in the reduced set may comprise: means for performing, for each entry in the reduced set, the following steps: computing, based on estimated wideband instantaneous throughput and average throughput for each UE in the entry, PF metrics for the respective UEs in the entry; and summing the respective computed PF metrics to obtain a summed PF metric for the entry, based on: SumPF=$\Sigma_i$PF(i), wherein SumPF is the summed PF metric, and PF(i) is the computed PF metric for the i-th UE.

In an example, computing the PF metrics for the respective UEs in the entry of the panel-to-UE assignment may include computing a PF metric of a UE based on the equation:

$$PF(i) = \frac{R_i^\alpha}{\overline{R}_i^\beta},$$

wherein PF(i) is the PF metric of the i-th UE, $R_i^\alpha$ is an estimated instantaneous throughput for the i-th UE. $\overline{R}_i$ is an average throughput of the i-th UE, and $\alpha$ and $\beta$ are parameters configured to tradeoff between fairness and the average throughput. $\alpha$ and $\beta$ may be configured with a default value of 1.

In an example, the apparatus may further comprise: means for determining, for each entry in the reduced set, respective representations of a full radio channel at respective UEs in the entry to thereby obtain respective precoded composite channel representations at the respective UEs in the entry, wherein the determinations are based on the panel-to-UE assignment associated with the entry, the associated serving beams configured for the respective UEs in the entry, and a digital precoder selected for the respective UEs in the entry configured to maximize signal strength and mitigate inter-UE interference.

According to a $4^{th}$ aspect, there is disclosed a non-transitory computer readable medium comprising executable instructions, which when executed by a processor of the apparatus according to the $1^{st}$ aspect and associated examples, cause the processor to perform the method according to the $2^{nd}$ aspect and associated examples.

BRIEF DESCRIPTION OF THE DRAWINGS

In so that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 6a and 6b depict respective tables for reduced sets of panel-to-UE assignment, in accordance with a first aspect of the present disclosure.

FIGS. 7a and 7b depict respective tables for reduced sets of panel-to-UE assignment, in accordance with a second aspect of the present disclosure.

FIGS. 8a and 8b depict respective tables for reduced sets of panel-to-UE assignment, in accordance with a third aspect of the present disclosure.

DETAILED DESCRIPTION

Figure 1:
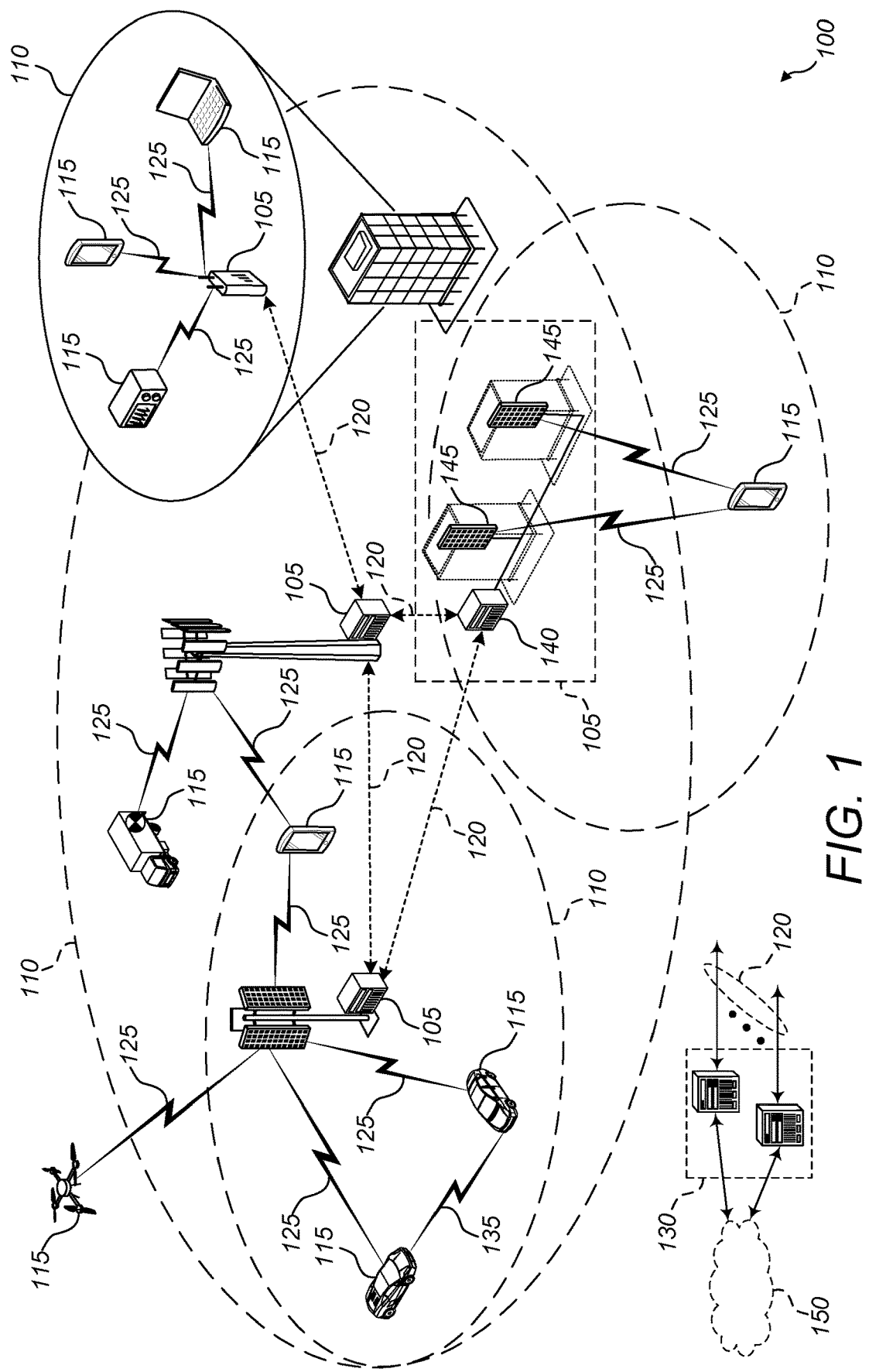
FIG. 1 is a block diagram conceptually illustrating an example telecommunications system, in which aspects of the present disclosure may be performed.

Aspects of the present disclosure provide a method and a corresponding apparatus (at a network entity, e.g. an eNB, or a gNB) for scheduling multi-user multiple-input multiple-output (MU-MIMO) transmissions to a co-scheduled set of user equipment (UEs) from an antenna array comprising multiple (antenna) panels. The method comprises: determining a reduced set of entries of panel-to-UE assignment from among multiple combinations of panel-to-UE assignment; and selecting, from within the reduced set, an entry of the panel-to-UE assignment for scheduling, based on a proportionately fair (PF) metric, wherein a panel-to-UE assignment is a mapping of the panels assigned to transmit to a selection of the UEs using associated serving beams configured for transmission to the respective UEs.

The following description provides examples of scheduling MU-MIMO transmissions to a co-scheduled set of UEs from an antenna array with multiple panels, but are not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration". Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, and etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g. 5G NR) wireless technologies, aspects of the present disclosure can be applied in other generation-based communication systems configured for MU-MIMO transmissions.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Some wireless communication systems may include communication devices, such as user equipments (UEs) and network entities, for example, next-generation NodeBs or giga-NodeBs (either of which may be referred to as a gNB) that may support multiple radio access technologies including fourth generation (4G) systems such as Long Term Evolution (LTE) systems and fifth generation (5G) systems which may be referred to as New Radio (NR) systems. In some cases, some wireless communications systems, such as 4G systems and 5G systems, may employ techniques such as transmit diversity, receive diversity, multiple-input multiple-output (MIMO) communications, or beamforming to support high reliability and high data throughput operations.

FIG. 1 illustrates an example of a wireless communications system 100 that supports non-coherent transmission diversity communications, in accordance with aspects of the present disclosure. The wireless communications system 100 may include one or more network entities 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g. mission critical) communications, low latency communications, communications with low-cost and low-complexity devices, or any combination thereof.

The network entities 105 may be dispersed throughout a geographic area to form the wireless communications system 100, and may be devices in different forms or having different capabilities. The network entities 105 and the UEs 115 may wirelessly communicate via one or more communication links 125. Each network entity 105 may provide a coverage area 110 over which the UEs 115 and the network entity 105 may establish one or more communication links 125. The coverage area 110 may be an example of a geographic area over which a network entity 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some examples UEs 115 are illustrated in FIG. 1. The UEs 115 described herein may be able to communicate with various types of devices, such as other UEs 115, the network entities 105, or network equipment (e.g. core network nodes, relay devices, integrated access and backhaul (IAB) nodes, or other network equipment), as shown in FIG. 1.

The network entities 105 may communicate with the core network 130, or with one another, or both. For example, the network entities 105 may interface with the core network 130 through one or more backhaul links 120 (e.g. via an S1, N2, N3, or other interface). The network entities 105 may communicate with one another over the backhaul links 120 (e.g. via an X2, Xn, or other interface) either directly (e.g. directly between network entities 105), or indirectly (e.g. via core network 130), or both. In some examples, the backhaul links 120 may be or include one or more wireless links.

One or more of the network entities 105 described herein may include or may be referred to by a person having ordinary skill in the art as a base transceiver station, a radio network entity, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the network entities 105 and the network equipment including macro eNBs or gNBs, small cell eNBs or gNBs, or relay network entities, among other examples, as shown in FIG. 1.

The UEs 115 and the network entities 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (e.g. LTE, LTE-A, LTE-A Pro, NR). Each physical layer channel may carry acquisition signaling (e.g. synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g. in a carrier aggregation configuration), a carrier may also have acquisition signaling or control signaling that coordinates operations for other carriers. A carrier may be associated with a frequency channel (e.g. an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g. of the same or a different radio access technology).

The communication links 125 shown in the wireless communications system 100 may include uplink transmissions from a UE 115 to a network entity 105, or downlink transmissions from a network entity 105 to a UE 115. Carriers may carry downlink or uplink communications (e.g. in an FDD mode) or may be configured to carry downlink and uplink communications (e.g. in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g. 1, 4, 3, 5, 10, 15, 20, 40, or 80 megahertz (MHz)). Devices of the wireless communications system 100 (e.g. the network entities 105, the UEs 115, or both) may have hardware configurations that support communications over a particular carrier bandwidth or may be configurable to support communications over one of a set of carrier bandwidths. In some examples, the wireless communications system 100 may include network entities 105, or UEs 115 that support simultaneous communications via carriers associated with multiple carrier bandwidths. In some examples, each served UE 115 may be configured for operating over portions (e.g. a sub-band, a BWP) or all of a carrier bandwidth.

Signal waveforms transmitted over a carrier may be made up of multiple subcarriers (e.g. using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol duration (e.g. the duration of one modulation symbol) and one subcarrier, in some examples, the symbol duration and subcarrier spacing are inversely related. The number of bits carried by each resource element may depend on the modulation scheme (e.g. the order of the modulation scheme, the coding rate of the modulation scheme, or both). The more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g. spatial layers or beams), and the use of multiple spatial layers may further increase the data rate or data integrity for communications with a UE 115.

One or more numerologies for a carrier may be supported, in some examples, a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling duration of $Ts=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g. 10 milliseconds (ms)). Each radio frame may be identified by a system frame number (SFN) (e.g. ranging from 0 to 1023).

Each frame may include multiple consecutively numbered subframes or slots, and each subframe or slot may have the same duration. In some examples, a frame may be divided (e.g. in the time domain) into subframes, and each subframe may be further divided into a number of slots. Alternatively, each frame may include a variable number of slots, and the number of slots may depend on subcarrier spacing. Each slot may include a number of symbol durations (e.g. depending on the length of the cyclic prefix prepended to each symbol). In some wireless communications systems 100, a slot may further be divided into multiple mini-slots containing one or more symbols. Excluding the cyclic prefix, each symbol duration may contain one or more (e.g. $N_f$) sampling durations. The duration associated with a symbol duration may depend on the subcarrier spacing or frequency band of operation.

A subframe, a slot, a mini-slot, or a symbol may be the smallest scheduling unit (e.g. in the time domain) of the wireless communications system 100 and may be referred to as a transmission time interval (TTI). In some examples, the TTI duration (e.g. the number of symbol durations in a TTI) may be variable. Additionally or alternatively, the smallest scheduling unit of the wireless communications system 100 may be dynamically selected (e.g. in bursts of shortened TTIs (STTIs)).

Physical channels may be multiplexed on a carrier, according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g. a control resource set (CORESET)) for a physical control channel may be defined by a number of symbol durations and may extend across the system bandwidth or a subset of the system bandwidth of the carrier. One or more control regions (e.g. CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g. control channel elements (CCEs)) associated with encoded information for a control information format having a given payload size. Search space sets may include common search space sets configured for sending control information to multiple UEs 115 and UE-specific search space sets for sending control information to a specific UE 115.

Each network entity 105 may provide communication coverage via one or more cells, for example a macro cell, a small cell, a hot spot, or other types of cells, or any combination thereof. The term "cell" may refer to a logical communication entity used for communication with a network entity 105 (e.g. over a carrier) and may be associated with an identifier for distinguishing neighboring cells (e.g. a physical cell identifier (PCID), a virtual cell identifier (VCID), or others). In some examples, a cell may also refer to a geographic coverage area 110 or a portion of a geographic coverage area 110 (e.g. a sector) over which the logical communication entity operates. Such cells may range from smaller areas (e.g. a structure, a subset of structure) to larger areas depending on various factors such as the capabilities of the network entity 105. For example, a cell may be or include a building, a subset of a building, or exterior spaces between or overlapping with geographic coverage areas 110, among other examples.

A macro cell generally covers a relatively large geographic area (e.g. several kilometers in radius) and may allow unrestricted access by the UEs 115 with service subscriptions with the network provider supporting the macro cell. A small cell may be associated with a lower-powered network entity 105, as compared with a macro cell, and a small cell may operate in the same or different (e.g. licensed, unlicensed) frequency bands as macro cells. Small cells may provide unrestricted access to the UEs 115 with service subscriptions with the network provider or may provide restricted access to the UEs 115 having an association with the small cell (e.g. the UEs 115 in a closed subscriber group (CSG), the UEs 115 associated with users in a home or office). A network entity 105 may support one or multiple cells and may also support communications over the one or more cells using one or multiple component carriers. In some examples, a carrier may support multiple cells, and different cells may be configured according to different protocol types (e.g. MTC, narrowband IoT (NB-IoT), enhanced mobile broadband (eMBB)) that may provide access for different types of devices.

In some examples, a network entity 105 may be movable and provide communication coverage for a moving geographic coverage area 110. In some examples, different geographic coverage areas 110 associated with different technologies may overlap, but the different geographic coverage areas 110 may be supported by the same network entity 105. In other examples, the overlapping geographic coverage areas 110 associated with different technologies may be supported by different network entities 105. The wireless communications system 100 may include, for example, a heterogeneous network in which different types of the network entities 105 provide coverage for various geographic coverage areas 110 using the same or different radio access technologies.

The wireless communications system 100 may support synchronous or asynchronous operation. For synchronous operation, the network entities 105 may have similar frame timings, and transmissions from different network entities 105 may be approximately aligned in time. For asynchronous operation, the network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g. via Machine-to-Machine (M2M) communication). M2M communication or MTC may refer to data communication technologies that allow devices to communicate with one another or a network entity 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g. a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g. according to narrowband communications), or a combination of these techniques. For example, some UEs 115 may be configured for operation using a narrowband protocol type that is associated with a defined portion or range (e.g. set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g. mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g. using a peer-to-peer (P2P) or D2D protocol). One or more UEs 115 utilizing D2D communications may be within the geographic coverage area 110 of a network entity 105. Other UEs 115 in such a group may be outside the geographic coverage area 110 of a network entity 105 or be otherwise unable to receive transmissions from a network entity 105. In some examples, groups of the UEs 115 communicating via D2D communications may utilize a one-to-many (1:M) system in which each UE 115 transmits to every other UE 115 in the group. In some examples, a network entity 105 facilitates the scheduling of resources for D2D communications. In other cases, D2D communications are carried out between the UEs 115 without the involvement of a network entity 105.

In some systems, the D2D communication link 135 may be an example of a communication channel, such as a sidelink communication channel, between vehicles (e.g. UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g. network entities 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g. a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a network entity 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or network entity 105 may be distributed across various network devices (e.g. radio heads and ANCs), or consolidated into a single network device (e.g. a network entity 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g. less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHZ, also known as the centimeter band, or in an extremely high frequency (EHF) region of the spectrum (e.g. from 30 GHz to 300 GHz), also known as the millimeter band. The wireless communications system 100 may also operate in the Sub-6 band (e.g. middle and low frequency bands under 6 GHZ). In some examples, the wireless communications system 100 may support millimeter wave (mmW) communications between the UEs 115 and the network entities 105, and EHF antennas of the respective devices may be smaller and more closely spaced than UHF antennas. In some examples, this may facilitate use of antenna arrays within a device. The propagation of EHF transmissions, however, may be subjected to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g. LAA). Operations in unlicensed spectrum may include downlink transmissions, uplink transmissions, P2P transmissions, or D2D transmissions, among other examples.

A network entity 105 or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more network entity antennas or antenna arrays may be co-located at an antenna assembly, such as an antenna tower. In some examples, antennas or antenna arrays associated with a network entity 105 may be located in diverse geographic locations. A network entity 105 may have an antenna array with a number of rows and columns of antenna ports that the network entity 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g. the same codeword) or different data streams (e.g. different codewords). Different spatial layers may be associated with different antenna ports used for channel measurement and reporting. MIMO techniques include single-user MIMO (SU-MIMO).

In some examples, multiple spatial layers are transmitted to the same receiving device, and multi-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g. a network entity 105, a UE 115) to shape or steer an antenna beam (e.g. a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g. with respect to the antenna array of the transmitting device or receiving device, or with respect to some other orientation).

A network entity 105 or a UE 115 may use beam sweeping techniques as part of beam forming operations. For example, a network entity 105 may use multiple antennas or antenna arrays (e.g. antenna panels) to conduct beamforming operations for directional communications with a UE 115. Some signals (e.g. synchronization signals, reference signals, beam selection signals, or other control signals) may be transmitted by a network entity 105 multiple times in different directions. For example, the network entity 105 may transmit a signal according to different beamforming weight sets associated with different directions of transmission. Transmissions in different beam directions may be used to identify (e.g. by a transmitting device, such as a network entity 105, or by a receiving device, such as a UE 115) a beam direction for later transmission or reception by the network entity 105.

Some signals, such as data signals associated with a particular receiving device, may be transmitted by a network entity 105 in a single beam direction (e.g. a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the network entity 105 in different directions, and may report to the network entity 105 an indication of the signal that the UE 115 received with a highest signal quality or an otherwise acceptable signal quality.

In some examples, transmissions by a device (e.g. by a network entity 105 or a UE 115) may be performed using multiple beam directions, and the device may use a combination of digital precoding or radio frequency beamforming to generate a combined beam for transmission (e.g. from a network entity 105 to a UE 115). The UE 115 may report feedback that indicates precoding weights for one or more beam directions, and the feedback may correspond to a configured number of beams across a system bandwidth or one or more sub-bands. The network entity 105 may transmit a reference signal (e.g. a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g. a multi-panel type codebook, a linear combination type codebook, a port selection type codebook). Although these techniques are described with reference to signals transmitted in one or more directions by a network entity 105, a UE 115 may employ similar techniques for transmitting signals multiple times in different directions (e.g. for identifying a beam direction for subsequent transmission or reception by the UE 115) or for transmitting a signal in a single direction (e.g. for transmitting data to a receiving device).

A receiving device (e.g. a UE 115) may try multiple receive configurations (e.g. directional listening) when receiving various signals from the network entity 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g. different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g. when receiving a data signal). The single receive configuration may be aligned in a beam direction determined based on listening according to different receive configuration directions (e.g. a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a network entity 105 or a core network 130 supporting radio bearers for user plane data. At the physical layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g. using a cyclic redundancy check (CRC)), forward error correction (FEC), and retransmission (e.g. automatic repeat request (ARQ)). HARQ may improve throughput at the MAC layer in poor radio conditions (e.g. low signal-to-noise conditions). In some examples, a device may support same-slot HARQ feedback. The device may provide HARQ feedback in a specific slot for data received in a previous symbol in the slot. In other cases, the device may provide HARQ feedback in a subsequent slot, or according to some other time interval.

Figure 2:
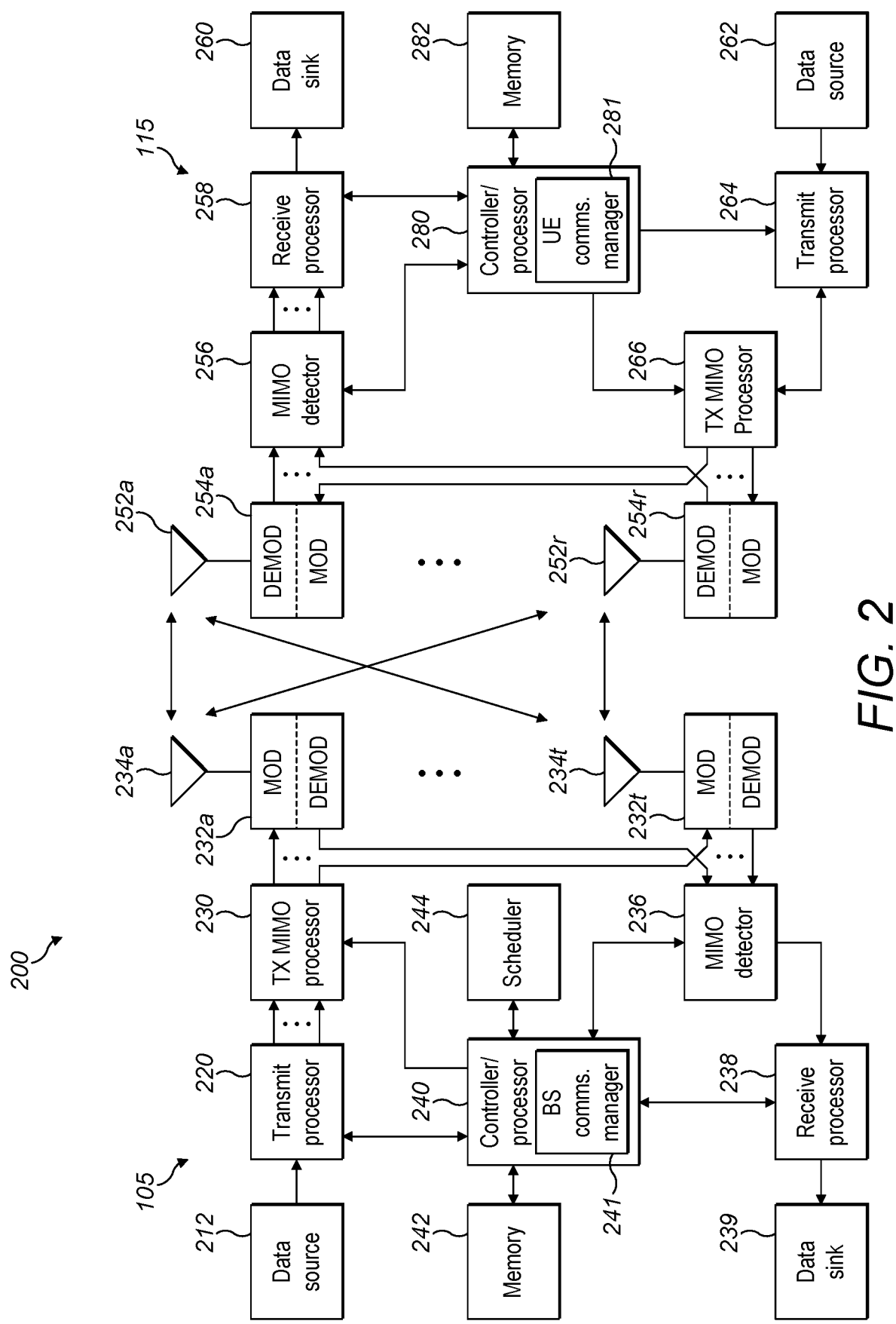
FIG. 2 is a block diagram conceptually illustrating a design of an example network entity and a user equipment (UE), in accordance with aspects of the present disclosure.

FIG. 2 illustrates a block diagram 200 of example components of the network entity 105 and the UE 115 (arranged in the wireless communications system 100 of FIG. 1), which may be used to implement aspects of the present disclosure.

At the network entity 105, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and etc. The data may be for the physical downlink shared channel (PDSCH), and etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The transmit processor 220 may process (e.g. encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g. precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g. for OFDM, etc.) to obtain an output sample stream. Each modulator may further process (e.g. convert to analog, amplify, filter, and upconvert) the output sample stream to obtain a downlink signal. Downlink signals from the modulators in transceivers 232a-232t may be transmitted via the antennas 234a-234t, respectively.

At the UE 115, the antennas 252a-252r may receive the downlink signals from the network entity 105, and may provide received signals to the demodulators (DEMODs) in transceivers 254a-254r, respectively. Each demodulator in transceivers 254a-254r may condition (e.g. filter, amplify, downconvert, and digitize) a respective received signal to obtain input samples. Each demodulator may further process the input samples (e.g. for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g. demodulate, deinterleave, and decode) the detected symbols, provide decoded data for the UE 120a to a data sink 260, and provide decoded control information to a controller/processor 280.

On the uplink, at UE 115, a transmit processor 264 may receive and process data (e.g. for the physical uplink shared channel (PUSCH)) from a data source 262 and control information (e.g. for the physical uplink control channel (PUCCH) from the controller/processor 280. The transmit processor 264 may also generate reference symbols for a reference signal (e.g. for the sounding reference signal (SRS)). The symbols from the transmit processor 264 may be precoded by a TX MIMO processor 266 if applicable, further processed by the modulators in transceivers 254a-254r (e.g. for SC-FDM, etc.), and transmitted to the network entity 105. At the network entity 105, the uplink signals from the UE 115 may be received by the antennas 234, processed by the demodulators in transceivers 232a-232t, detected by a MIMO detector 236 if applicable, and further processed by a receive processor 238 to obtain decoded data and control information sent by the UE 115. The receive processor 238 may provide the decoded data to a data sink 239 and the decoded control information to the controller/processor 240.

The memories 242 and 282 may store data and program codes for the network entity 105, and the UE 115, respectively. A scheduler 244 may schedule UEs for data transmission on the downlink and/or uplink.

Antennas 252, processors 266, 258, 264, and/or controller/processor 280 of the UE 115, and/or antennas 234, processors 220, 230, 238, and/or controller/processor 240 of the network entity 105 may be used to perform the various techniques and methods described herein. For example, as shown in FIG. 2, the controller/processor 240 of the network entity 105 includes a base station communications manager 241 that may be configured to perform the operations illustrated in FIG. 13, as well as other operations described herein. Additionally, as shown in FIG. 2, the controller/processor 280 of the UE 115 includes a UE communications manager 281. Although shown at the controller/processor, other components of the network entity 105 may also be configured to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, and etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
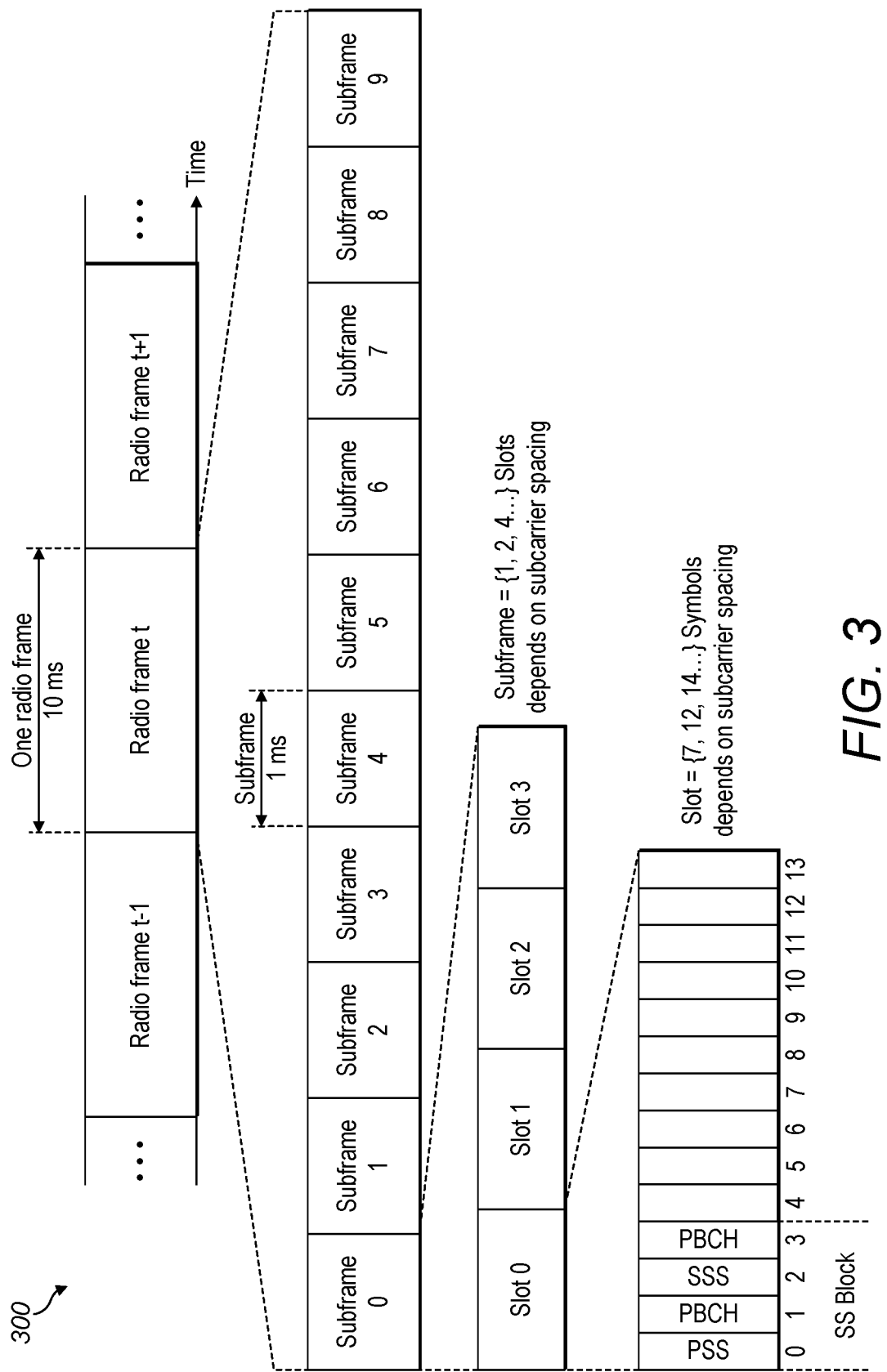
FIG. 3 illustrates an example of a frame format for a new radio (NR) system, in accordance with aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g. 10 ms) and may be partitioned into 10 subframes, each of 1 ms, with indices of 0 through 9. Each subframe may include a variable number of slots (e.g. 1, 2, 4, 8, 16, . . . slots) depending on the SCS. Each slot may include a variable number of symbol periods (e.g. 7, 12, or 14 symbols) depending on the SCS. The symbol periods in each slot may be assigned indices. A sub-slot structure may refer to a transmit time interval having a duration less than a slot (e.g. 2, 3, or 4 symbols). Each symbol in a slot may be configured for a link direction (e.g. DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g. including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, whereas the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Figure 4:
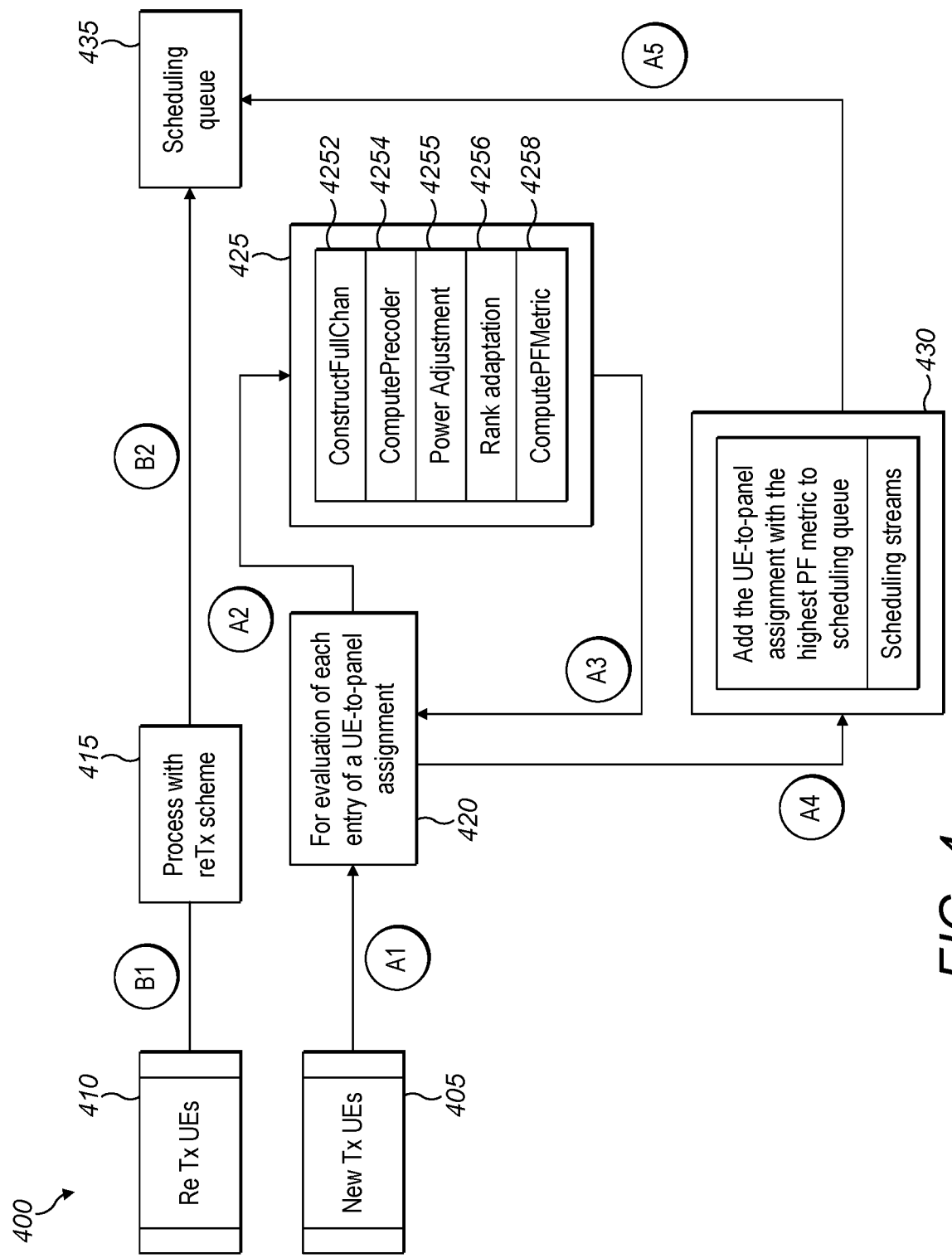
FIG. 4 shows a diagram illustrating an overview of a method associated with scheduling multi-user multiple-input multiple-output (MU-MIMO) transmissions, at a network entity, to a co-scheduled set of user equipment (UEs) from an antenna array comprising multiple panels, in accordance with aspects of the present disclosure.

FIG. 4 shows a diagram 400 illustrating an overview of a method associated with scheduling multi-user multiple-input multiple-output (MU-MIMO) transmissions, at a network entity (e.g. the network entity 105 depicted in FIGS. 1 and 2), to a co-scheduled set of user equipment (UEs) from an antenna array comprising multiple panels (or otherwise known as antenna panels), in accordance with aspects of the present disclosure. For avoidance of doubt, the antenna array is arranged on the network entity. In an example, each antenna panel is configured with 2 digitally controlled radio-frequency (RF) chains, but this is not to be construed as limiting.

According to an aspect, the procedures for scheduling MU-MIMO transmissions to a co-scheduled set of UEs from an antenna array may be implemented as an algorithm, which may conceptually be viewed as formed by separate operational blocks, as depicted in FIG. 4. The algorithm may also be termed a MU-MIMO scheduler that is arranged to be (digitally) executed (in software) on the network entity, although in other alternative aspects, the MU-MIMO scheduler may also be implemented in hardware (e.g. in the form of an application-specific integrated circuit (ASIC)).

To assist in understanding FIG. 4, a first flow tagged with flowing sequences from "A1" to "A5" is to be followed for the processing associated with the case of UEs requiring new transmissions, whereas a second flow tagged with flowing sequences from "B1" to "B2" is to be followed for the processing associated with the case of UEs requiring re-transmissions.

Descriptions follow, by way of example, in which transmissions from block 405 are to be scheduled along the first flow "A1" to "A5", and in which retransmissions from block 410 are to be scheduled along the second flow "B1" to "B2", but it will be understood that these are given by way of example only and that crossover between these two flows is possible. For example, retransmissions from block 410 could be included in the first flow at "A1" (e.g. low priority or early-attempts at retransmission) and/or first transmissions from block 405 could be inserted in the second flow at "B1" (e.g. high priority first transmissions).

At blocks 405, 410, it is first to be determined whether each of multiple candidate UEs to which transmissions are to be scheduled (by the network entity) requires new transmissions, or otherwise re-transmissions by the network entity (to the associated said candidate UE). It may be understood that the multiple candidate UEs may be considered the total number of UEs served by the network entity, and the co-scheduled set of UEs may be a subset of those multiple candidate UEs, selected by the network entity for transmitting to. That is, the co-scheduled set of UEs is a selection of those multiple candidate UEs. For example, the network entity may serve an average of 10 UEs in the vicinity, but it could be that only 4 out of the 10 UEs form the co-scheduled set of UEs. For the scheduling, the algorithm is further configured to prioritize candidate UEs having the highest number of HARQ attempts, i.e. UEs that required re-transmissions. This will be elaborated in later passages below.

Prior to actual scheduling, the network entity may initially sort the UEs by ascending order, or descending order, via assigning the UEs with indexes to categorize them based on ascending order, or descending order. For the ascending order, the indexes may be generated, based on individual UE proportionally fair (PF) metrics computed for the respective UEs, when configured in the instance to receive single-user (SU) transmission. For the descending order, the indexes may be generated, based on reference signals received power (RSRP) detected at the respective UEs, or based on measurement of respective sounding reference signals (SRS) from the respective UEs.

To enable the scheduling, a well-defined search space $S=\{s_1, s_2, s_3, \ldots\}$ is predetermined and generated, where $s_i$ represents an i-th entry (or candidate) of a panel-to-UE assignment. So, the search space S effectively comprises multiple entries of panel-to-UE assignment, which in turn represent a subset of all possible combinations of panel-to-UE assignment. The search space S provides a reduced set (or selection) of all the possible combinations of panel-to-UE assignment.

Particularly, the number of all possible combinations of panel-to-UE assignment is defined by the number of candidate UEs raised to the power of the number of panels, i.e. $U^P$ possible combinations, where U is the number of UEs, and P is the number of panels. For example, if the number of the panels and the UEs are respectively defined to be 4, the number of all possible combinations of panel-to-UE assignment is 256. In some examples, the number of the entries in the reduced set may preferably be optimized to either 8 or 16, but this is not to be construed as limiting in any way.

Also, the reduced set of the UEs may include at least one UE, and all the panels of the antenna array may be assigned to transmit to the at least one UE. Alternatively, it may be that the reduced set of the UEs specifies a selected combination of UEs made from the multiple candidate UEs.

It may be appreciated that searching over the reduced set of panel-to-UE assignment to arrange scheduling beneficially improves the performance-complexity tradeoff (i.e. practically reduces computational complexity, without sacrificing performance), versus searching over all the possible combinations of panel-to-UE assignment. Specifically, the reduced set is optimized to cover a pool of panel-to-UE assignment most likely to be used (i.e. "most likely" in this context means a greater frequency of usage) by the network entity for the scheduling. To ensure full coverage, the reduced set may also include important corner panel-to-UE assignment, on top of the likely panel-to-UE assignment.

The reduced set may be obtained (or generated) via computer simulations, prior to being provided to the network entity for the scheduling, but need not be limited as such. Moreover, it may also be that the reduced set is "a predefined set that works well for general geometric and energy distribution of UEs", which is an aim when performing the computer simulations, where many different scenarios of UE distributions are simulated. The computer simulations are not limited to a given UE distribution.

Alternatively, the reduced set may dynamically and flexibility be determined by the network entity, e.g. using smart learning algorithms that may derive a desired reduced set tailored towards a particular system configuration, and/or a specific distribution of UEs detected at a locale. The smart algorithms may utilize pertinent information, such as UEs positioning, large scale and small scale fading of UEs, as inputs to generate the desired reduced set.

Also, a panel-to-UE assignment defines a mapping of the panels (of the antenna array) assigned to transmit to a selection of the multiple candidate UEs, using associated serving beams configured for transmission to the respective UEs in the said selection. Put another way, the mapping of the panels for transmitting to the selection of the UEs is associated with the beam assignment for the respective panels, since the respective UEs have respective preferred serving beams for communication.

The search space S may practically be implemented as a data table, stored on the network entity, or alternatively may be stored in a remote entity/component/device that is communicatively accessible by the network entity. Moreover, the stored data table may dynamically be refreshed to a newer, updated copy, as necessary—for example, over-the-air (OTA) updates may be pushed (by network operators) to the network entity to provide the update.

Once the UEs are ordered, as per block 420, each entry of panel-to-UE assignment (S) in the search space S is evaluated/measured using a proportional-fair (PF) scheduling metric (hereinafter "PF metric"). An example of a PF metric is described below, based on one or more of the further operations set out in block 425, although in other examples, alternative suitable metrics, besides the PF metric, may also be used. Thereafter, at block 430, an entry of panel-to-UE assignment determined to have the highest PF metric is selected, and other related associated operations, such as scheduling data streams for transmissions, and etc., may be performed as well. In block 435, the network entity proceeds to schedule transmissions, based on the selected panel-to-UE assignment, in a next TTI.

Hence, scheduling MU-MIMO transmissions to a co-scheduled set of UEs from the antenna array broadly comprises: determining a reduced set of entries of panel-to-UE assignment from among multiple combinations of panel-to-UE assignment; and selecting, from within the reduced set, an entry of the panel-to-UE assignment for scheduling, based on a PF metric.

For avoid of doubt, the reduced set of entries of panel-to-UE assignment may normally comprise a plurality of entries, but in some instances, may also comprise a single entry, which does not affect performance of the disclosed method of scheduling. That is, the reduced set of entries of panel-to-UE assignment may include at least one entry of panel-to-UE assignment, but preferably includes multiple entries of panel-to-UE assignment and less than all the possible combinations of panel-to-UE assignment. An example of just one entry of panel-to-UE assignment is where (per polarization) there is just one UE seeking transmission, in which case all the panels of the antenna array may be assigned to transmit to that one UE. Alternatively, it may also be that the reduced set of entries of panel-to-UE assignment corresponds to a selected sub-set of UEs made from the multiple candidate UEs.

It is to be noted that the selection of the entry of the panel-to-UE assignment for scheduling may comprise: computing PF metrics for the respective entries in the reduced set of the panel-to-UE assignment; selecting, from the reduced set, an entry having a maximum value for the computed PF metric as the selected entry of the panel-to-UE assignment for scheduling; and scheduling, based on the selected entry, a MU-MIMO transmission in a next TTI.

To elaborate block 425, one of the further operations (i.e. block 4252) may comprise: determining, for each entry in the reduced set, respective representations of a full radio channel at respective UEs in the entry to thereby obtain respective representations of a precoded composite channel (i.e. refer to the discussions of the equivalent channel in the passage immediately afore equation (5)) at the respective UEs in the entry. The determinations are based on the panel-to-UE assignment associated with the entry, the associated serving beams configured for the respective UEs in the entry, and a digital precoder selected for the respective UEs in the entry configured to maximize signal strength and mitigate inter-UE interference.

The representation of a full radio channel at a UE is defined under equation (1):

$$H_i = \begin{bmatrix} H_i^{b(0)} & H_i^{b(1)} & H_i^{b(2)} & \ldots & H_i^{b(N_p)} \end{bmatrix} \quad (1)$$

$H_i$ is the full radio channel at the i-th UE and is a matrix of dimension m×n, and $H_i^{b(j)}$ is a radio channel at the i-th UE formed by a serving beam b(j) transmitted from the j-th panel of the multiple panels, beam b(j) is the serving beam for the UE assigned to the j-th panel, and $N_p$ is the number of panels of the antenna array.

Singular value decomposition (SVD) may subsequently be performed on $H_i$ of the full radio channel at the i-th UE to obtain $U_i S_i V_i^*$, whereby $U_i$ is a complex unitary matrix of dimension m×m, $S_i$ is a rectangular diagonal matrix of dimension m×n having non-negative real number entries in the main diagonal, and $V_i$ is a complex unitary matrix of dimension n×n, and * denotes an operator for complex conjugate transpose. As part of the computation, $H_i$ may then be equalized, as defined by equation (2):

$$\hat{H}_i = U_i^* H_i \quad (2)$$

$\hat{H}_i$ denotes the equalized radio channel at the i-th UE.

Additionally, one of the further operations (i.e. block 4254) in block 425 may comprise: computing a multi-user (MU) digital precoder for precoding the serving beams based on equation (3):

$$P = \hat{H}^* (\epsilon I + \hat{H} \hat{H}^*)^{-1} G \quad (3)$$

P is a precoder matrix of the MU digital precoder, $\hat{H}$ is the full composite equalized radio channel obtained with $$\hat{H} = \begin{bmatrix} \hat{H}_0 \\ \hat{H}_1 \\ \vdots \\ \hat{H}_{K-1} \end{bmatrix},$$

wherein K is the number of co-scheduled UEs, and $\hat{H}_i$ is the equalized radio channel at the i-th UE (as set out in equation (2)), I is an identity matrix of dimension m×m, and G is a diagonal matrix for power allocation defined as equation (4):

$$G = \text{diag}(g_0, g_1, \ldots, g_{K-1}) \quad (4)$$

$$g_i = \sqrt{\frac{P_{total}}{r_i^* n_{UE}(b_i)} \times \frac{n_p(b_i)}{4}},$$

in which $P_{total}$ is the total transmit power at the network entity, $r_i^*$ is the rank of the i-th UE, $n_p(b_i)$ is the number of panels configured to transmit the serving beam b; to the i-th UE, and $n_{UE}(b_i)$ is the number of UEs sharing the serving beam $b_i$. Compared to equal power allocation across all streams, the gains $g_i$'s are chosen to maximize power usage on each panel. This operation, referencing equation (4), corresponds to the power adjustment procedure performed at block 4255 (of block 425). Optionally, the computed MU digital precoder may further be scaled with a global scale to satisfy a per-port power constraint, if such a per-port power constraint is imposed.

It is to be appreciated that the MU precoder is arranged to maximize the signal-to-leak ratio (SLR) at the desired UE, and may be considered equivalent to a singular value decomposition (SVD) precoder for single-user (SU) cases.

In connection, one of the further operations in block 425 may further comprise: computing, for each entry in the reduced set, and based at least on the precoded composite channel representations, channel quality indicators (e.g. signal-to-interference-and-noise ratios (SINRs)) associated with respective data streams to be transmitted by the respective serving beams. The estimated wideband instantaneous throughput (used in computing the PF metrics for the respective entries in the reduced set) may be calculated, based on the computed channel quality indicators.

Further, it is to be appreciated that the equivalent channel (i.e. a precoded composite channel) for a precoding resource block group (PRG), j, is defined as $\tilde{H}_j = \hat{H}_j P_j$, in which $\hat{H}_j$ is the equalized channel for the PRG j, and $P_j$ is the precoder matrix for the PRG j (which may be computed from equation (3)). It is to be appreciated that both terms $\hat{H}$ and P are now further denoted (as subscript) with the index j for the PRG j, since they are computed per PRG. The channel power metric is then obtained by an element-wise amplitude squared operation expressed as equation (5):

$$\tilde{P}_j[m, n] = |\tilde{H}_j[m, n]|^2 \quad (5)$$

The channel power metric illustrates the power in the composite channel of a desired signal of each UE, and interference leaked to other UEs. The diagonal terms represent desired UE signal energies, while the off-diagonal terms represent leakage of energy due to interfering UEs. It follows that for the PRG j, the SINR for an m-th data stream (indexing across all data streams of the selected UEs) may be obtained as per equation (6):

$$SINR_{m,j} = \frac{\check{P}_j[m, n]}{\sum_{n \neq m} \check{P}_j[m, n] + N_0} \quad (6)$$

$N_0$ denotes an expected thermal noise power. That is, a per stream, per PRG capacity may be derived from the corresponding SINR, based on the highest achievable spectral efficiency while maintaining a desired target block error rate.

Thereafter, one of the further operations (i.e. block 4256) in block 425 may further comprise: performing, for each entry in the reduced set, rank adaption for ranks of the respective UEs in the entry. Performance of rank adaption may be based on the assignment of the panels in the associated entry. In some aspects, for simplicity, a full rank of 2 is initially used for any computations in the described techniques. Rank adaption in this context may mean downgrading the rank from 2 to 1 for individual UEs if spectral efficiency with single layer outperforms two layers, whilst assuming other UEs are configured with the rank of 2. A further simplification may be to perform rank adaptation only for SU cases (to cover cell-edge UEs); for MU cases, if the full rank of 2 is determined to be sub-optimal, an entry of panel-to-UE assignment that schedules transmission to fewer UEs may instead be selected.

For the rank adaption, in respect of a case corresponding to SU scheduling of the i-th UE, and for each possible rank r=1, 2, the estimated wideband capacity (i.e. the spectral efficiency) may be calculated, according to equation (7):

$$SE_r^{est}(i) = \frac{1}{N_{PRG}} \sum_{l=1}^{r} \sum_{j \in PRGs} f(SINR_{i,l,r,j}) \quad (7)$$

$SE_r^{est}(i)$ is the estimated wideband capacity, $SINR_{i,l,r,j}$ is the SINR for the i-th UE, l is a stream, r is the rank, j is a precoding resource block group (PRG), and f(x) represents a function defined by a constrained Quadrature Amplitude Modulation (QAM) capacity curve.

The rank for the i-th UE in the SU case is selected to be $r_i^*$ that maximizes the value of $SE_r^{est}(i)$. For all MU entries in the reduced set, it may be that r maximizes the value of $SE_r^{est}(i)$ while assuming other UEs are assigned with a rank of 2, or is set to 2 for each i-th UE to be scheduled.

It is highlighted that the index, j, for the PRG is included herein for the purpose of illustrating wideband aggregation. The estimated wideband capacity $SE_{r_i^*}^{est}(i)$ obtained with selected rank $r_i^*$ is then mapped to an estimated instantaneous throughput value $R_i$.

Referring to block 4258 in block 425, computing the PF metrics for the respective entries in the reduced set may comprise: performing, for each entry in the reduced set, the following steps: (i). computing, based on estimated wideband instantaneous throughput and average throughput for each UE in the entry, PF metrics for the respective UEs in the entry; and (ii). summing the respective computed PF metrics to obtain a summed PF metric for the entry, as set out by equation (8):

$$SumPF = \sum_i PF(i) \quad (8)$$

SumPF is the summed PF metric, and PF(i) is the computed PF metric for the i-th UE.

Step (i) may include computing a PF metric of a UE based on equation (9):

$$PF(i) = \frac{R_i^\alpha}{\overline{R}_i^\beta} \quad (9)$$

PF(i) is the PF metric of the i-th UE, $R_i^\alpha$ is the estimated instantaneous throughput for the i-th UE, $\overline{R}_i$ is an average throughput of the i-th UE, and $\alpha$ and $\beta$ are parameters configured to tradeoff between fairness and the average throughput. It is to be appreciated that the instantaneous throughput is a scaled version of the spectral efficiency (SE), and the associated notation given in equation (9) is consistent with the average throughput and also conforms to the standard definition known in the art. When $\alpha$ has a value of 1 and $\beta$ has a value of 0, it implies maximum throughput is prioritized (over fairness). When $\alpha$ has a value of 0 and $\beta$ has a value of 1, it implies maximum fairness is instead prioritized (over throughput), but both a and $\beta$ may take on a default value of 1 in this example. In other examples, $\alpha$ may be set to 1 and $\beta$ may otherwise take on a value of at least 0.4 to 0.5 to ensure good throughput, without sacrificing fairness.

As afore explained, the wideband capacity is estimated based on the transmission of the number of data streams, with reference to the rank of $r_i^*$. For instance, the wideband capacity is aggregated across 2 streams for a rank of 2, and is also aggregated across the frequency band.

It is to be appreciated that each of the blocks 4252-4258 may be optional for the described scheduling of MU-MIMO transmissions to a co-scheduled set of UEs from the antenna array. For example, rather than computing the MU digital precoder in the manner as described above, other suitable precoders may also be utilized. Further, suitable learning algorithms may be used to predict an alternative performance metric, which could be different to the PF metric, as above described, depending on a desired optimization goal.

Prior to performing selection of an entry of the panel-to-UE assignment for scheduling, full channel sounding may optionally be performed for each UE of a set of UEs to be served by the network entity, which may include: performing, for each serving beam of the associated serving beams configured for transmission to the respective UEs, the following step: receiving, from the set of the UEs, respective sounding reference signals (SRSs) transmitted on an associated SRS resource (symbol). The respective SRSs may be transmitted by the respective UEs on respective different frequency resources.

Figure 5:
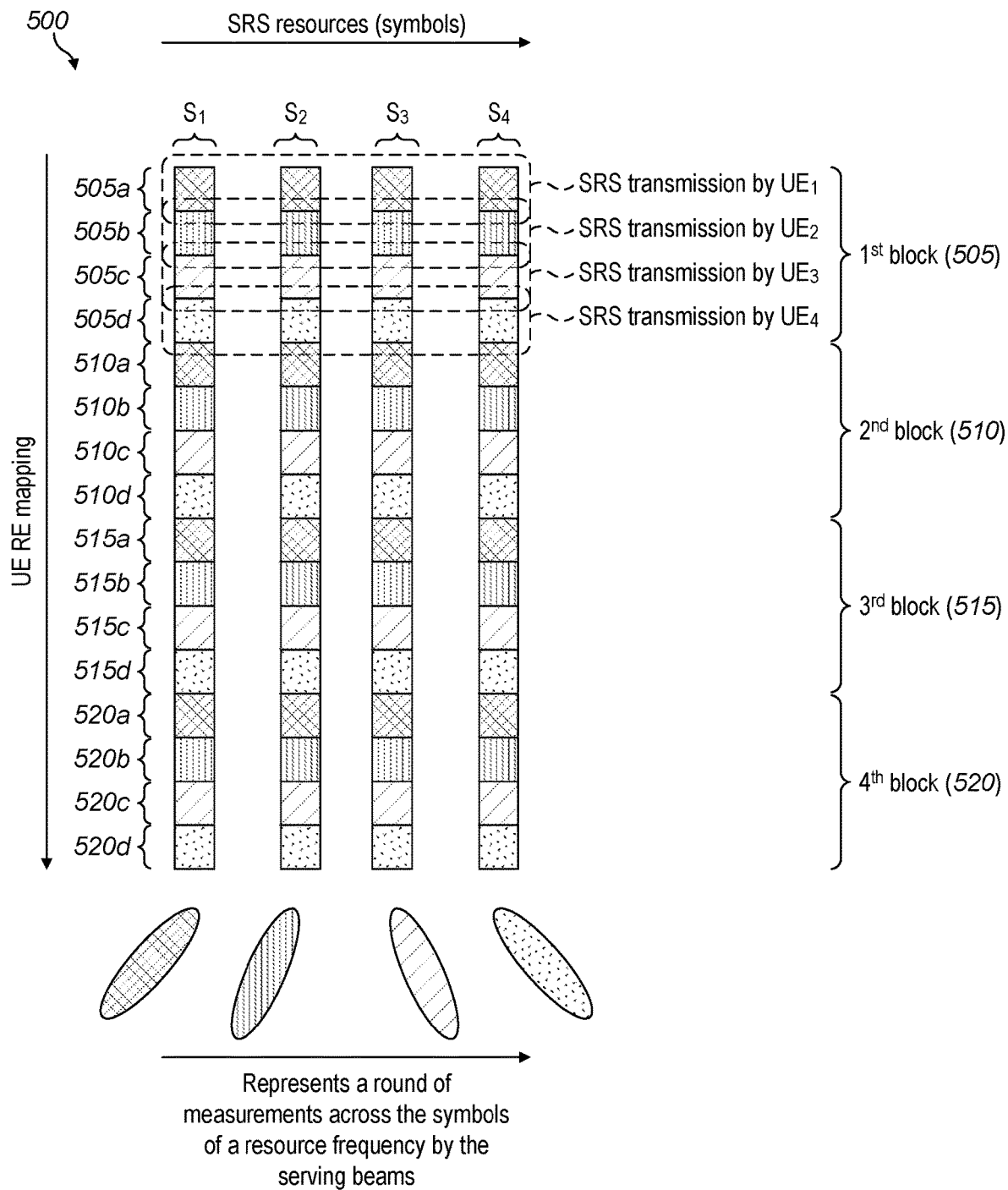
FIG. 5 is a diagram illustrating a procedure of full channel sounding, in accordance with aspects of the present disclosure.

To better explain the concept of full channel sounding, reference is hereby made to FIG. 5, which illustrates a procedure 500 of full channel sounding (in accordance with aspects of the present disclosure) that enables joint direct channel and cross-beam channel measurements. "Direct channel" means the radio channel to a UE formed by a gNB panel arranged to use a beam that serves the said UE. This correspondingly means respective UEs have respective direct channels, in view of the multiple antenna panels of the antenna array. It may correspondingly be understood that cross-channels for the UE are then formed by respective gNB panels arranged to use respective beams that serve other respective UEs in the vicinity of a locale.

In a non-limiting example to explain the procedure 500, it is assumed 4 UEs (i.e. $UE_1$, $UE_2$, $UE_3$, $UE_4$) are to be co-scheduled, 4 SRS resource symbols ($S_1$, $S_2$, $S_3$, $S_4$) are allocated for use by each UE, and 4 panels are arranged in the antenna array. This also implies there are 4 respective serving beams, each preferred by the respective 4 UEs.

Moreover, for sake of simplicity in illustration and explanations, merely 4 blocks of frequency resources 505-520 (with the 4 SRS resource symbols) are depicted in FIG. 5, but is not to be construed as restricting the scope of the procedure 500 of full channel sounding in any manner.

In FIG. 5, tones/frequencies are shown down the vertical axis. As depicted in FIG. 5, each UE is to transmit a SRS signal (i.e. a SRS transmission), across all the 4 SRS resource symbols, and per UE, a SRS transmission is made on every $4^{th}$ tone/frequency for said associated UE (i.e. SRS transmissions by respective UEs are made on different respective frequency resources 505-520, and each frequency resource 505-520 is arranged with the 4 symbols, $S_1$, $S_2$, $S_3$, and $S_4$).

Referring to the $1^{st}$ symbol $S_1$, each UE makes a SRS transmission on every $4^{th}$ tone (of a block of frequency resource 505-520). For instance, $UE_1$ transmits on the frequency resources 505a, 510a, 515a, 520a, while $UE_2$ transmits on the frequency resources 505b, 510b, 515b, 520b, and the like for $UE_3$, $UE_4$. Hence, for example in a $1^{st}$ block 505 of frequency resource, all the 4 UEs make respective SRS transmissions on the respective allocated frequency resources 505a-505d, as referenced to the $1^{st}$ symbol $S_1$. This may be understood in the same manner for the remaining blocks of frequency resources 510-520, in respect of the $1^{st}$ symbol $S_1$. Also, for the measurement timeframe under the $1^{st}$ symbol $S_1$, the preferred serving beam of $UE_1$ is assigned to all panels of the antenna array for measurements (by the network entity) of respective rounds of SRS transmissions (in the $1^{st}$ symbol $S_1$) by the respective UEs in the 4 blocks of frequency resources 505-520.

It is highlighted that in the frequency domain, the measurements made using the serving beam of $UE_1$ happens simultaneously for all the SRS transmissions made on the frequency resources 505-520. The said serving beam of $UE_1$ is maintained (i.e. on all panels of the antenna array) across the different frequency resources 505-520 for the measurements made under the symbol $S_1$, and is only changed when measuring across different symbols, as elaborated below.

Next, for the $2^{nd}$ symbol $S_2$, similar SRS transmissions are made by the respective UEs (using the different blocks of frequency resources 505-520), but the preferred serving beam is now switched (from that of $UE_1$) to the preferred serving beam of $UE_2$ and is then assigned to all panels of the antenna array for measurements under the $2^{nd}$ symbol $S_2$. Accordingly, measurements of SRS transmissions under the 3rd and $4^{th}$ symbols $S_3$, $S_4$ are carried out in a similar corresponding fashion, but with the preferred serving beams of $UE_3$ and $UE_4$ being respectively used instead, with reference to measurements under the $3^{rd}$ and $4^{th}$ symbols $S_3$, $S_4$.

It is hereby stated that a $1^{st}$ definition of "a round of measurements" may be referencing measurements of SRS transmissions made (across on all the frequency resources) under a specific symbol using a specific serving beam (e.g. across all the frequency resources 505a to 520d under the first symbol $S_1$, or across all the frequency resources 505a to 520d under the second symbol $S_2$). As a result, it may be appreciated that there are 4 rounds of measurements in this example, with reference to the 4 symbols, $S_1$, $S_2$, $S_3$, $S_4$, because the measurements made in each round are to be based on utilizing a different serving beam of the 4 respective serving beams. In other arrangements, there may be fewer than 4 or more than 4 rounds, in part depending on the number of UEs, the number of serving beams, and an available quantity of frequency resources.

On the other hand, from the perspective of the 4 serving beams used for the measurements, a $2^{nd}$ definition of "a round of measurements" may also be stated as measurements of SRS transmissions made by a UE across the different symbols of a specific frequency resource (e.g. across the symbols, $S_1$, $S_2$, $S_3$, and $S_4$ of the frequency resource 505a in the $1^{st}$ block 505).

To summarize, each "round of measurements" (according to the $1^{st}$ definition above), in relation to the SRS transmissions (made on the respective allocated frequency resources) by the respective UEs, are received by the network entity using a preferred serving beam of a different UE (of the UEs to be co-scheduled), i.e. there is configured a rotation of a serving beam assigned to the panels of the antenna array for measurements under the different rounds, until the last serving beam is eventually assigned. A default serving beam may be assigned for the measurement, in the event there is a frequency resource(s) not allocated to a corresponding UE. By way of the procedure 500, both the direct channel between a UE and its serving beam, and the cross-channels between each UE and the remaining UEs' serving beams may be fully measured to gain an improved understanding of their surrounding channel conditions for MU-MIMO scheduling.

Referring again to block 410 of FIG. 4, it has been explained that candidate UEs requiring re-transmissions (i.e. those with previous HARQ attempts) are preferably prioritized over candidate UEs at block 405 waiting for new transmissions. Further prioritization can be made in block 415 among candidate UEs requiring re-transmission. Those with a higher number of previous HARQ attempts can be prioritized over those with fewer HARQ attempts. Two different schemes are described herein below to handle this use scenario. The first scheme may be referred to as the "Single-user MIMO Retransmission" (SURETX) scheme, which involves selecting a UE associated with the highest number of HARQs attempts; assigning all the panels to transmit to the selected UE for a MIMO retransmission; and scheduling the MIMO retransmission in a next TTI—refer to block 435. The SURETX scheme is arranged to handle retransmissions to the selected UE using SU-MIMO transmissions. For avoidance of doubt, the number of candidate UEs that require re-transmissions thereto may be 0, or 1, or a plurality.

The second scheme may be referred to as the "Same Combination Retransmission" (SAMECOMBO) scheme, where if there is only a single UE waiting for retransmissions, a MU-MIMO transmission is then scheduled in a next TTI (as per block 435), based on the same panel-to-UE assignment that was utilized for making the initial transmission to the said UE that led to those attempts of HARQs.

On the other hand (under the second scheme), if there are multiple UEs (i.e. 2 or more UEs) waiting for retransmissions, those UEs are first ordered by the respective numbers of HARQ attempts made (e.g. from highest to lowest), and then scheduling retransmissions to the respective UEs is processed accordingly in a serial manner in the determined order, as per the case of a single UE waiting for retransmissions, until all the UEs have been scheduled. For example, if there are two UEs, $UE_A$ and $UE_B$, waiting for respective retransmissions, and amongst them, $UE_A$ has the higher number of HARQ attempts, $UE_A$ is scheduled first to receive retransmissions in $TTI_A$, based on the methodology described for the case of the single UE. Once completed, $UE_B$ is next scheduled to receive retransmissions in $TTI_B$, based on the methodology described for the case of the single UE, in which $TTI_B$ occurs later in time than $TTI_A$.

Separately, it may be understood that if UEs which wait for retransmissions are initially scheduled based on a same panel-to-UE assignment, the above scheduling (under the second scheme) for retransmissions to multiple UEs would automatically cover these UEs concurrently. For instance, if $UE_A$ and $UE_B$ are initially scheduled to receive transmissions, based on a same panel-to-UE assignment, $S_{A+B}$, then scheduling retransmissions to $UE_A$ via said panel-to-UE assignment, $S_{A+B}$, automatically causes retransmissions to also be scheduled to $UE_B$ at the same time, due to selection of the same said panel-to-UE assignment, $S_{A+B}$ for the retransmissions.

Advantageously, the disclosed techniques for scheduling MU-MIMO transmissions, based on the reduced set, to the co-scheduled set of UEs from the antenna array, may optimize same-beam, adjacent beams, and separated spatial beams co-scheduling for maximizing overall system performance of the network entity. Joint optimization of UE selection and beams assignment for the scheduling, based on the highest sum of PF metric obtained, is also enabled. This may promote improved, fairer co-scheduling of all the UEs to receive MU-MIMO transmissions. The described techniques further allow for performance of multi-user (MU)-based precoding with full channel sounding (including both direct and cross-channels).

Indeed, the disclosed techniques for MU-MIMO scheduling are able to achieve a much higher system capacity compared to SU-MIMO scheduling, and also provide similar performance as scheduling via exhaustive search (over all possible combinations of panel-to-UE assignment), but with an improved advantage of significantly-reduced complexity. This therefore enables flexible and practical implementation of MU-MIMO transmissions by co-scheduling UEs with same, adjacent and/or separated serving beams.

Accordingly, the described techniques may consequently provide improvements to power consumption, spectral efficiency, higher data rates and, in some examples, may further promote enhanced efficiency for high reliability and low latency multicast operations in 5G systems, among other benefits.

FIGS. 6a and 6b depict respective tables 600, 620 for reduced sets of panel-to-UE assignment, in accordance with a first aspect of the present disclosure. Each reduced set of panel-to-UE assignment is reduced vis-à-vis the number $U^P$ of all possible combinations of panel-to-UE assignment. The explanations below for a first table 600 of FIG. 6a are similarly applicable to a second table 620 of FIG. 6b. In an example, it is assumed there are a total of 4 panels (i.e. "Panel 1", "Panel 2", "Panel 3", and "Panel 4") arranged in the antenna array, and the network entity serves 4 UEs. The UEs are indexed and ordered in descending manner (using an index that takes an integer value between "1" to "4"), based on RSRP detected at the respective UEs. In this case, the "strongest" UE is assigned with the index "1", whereas the "weakest" UE is assigned with the index "4".

The context of the "strongest" (or "stronger") and "weakest" (or "weaker") may be understood with reference to the measured RSRP at the UEs. That is, a higher measured RSRP indicates a "stronger" UE, and vice-versa. A cell-edge UE is one example of a "weaker" UE. Other measures of strength, besides RSRP, are however possible too, e.g. SNR, SINR and the like. Measures of signal quality (such as bit error rate and the like) may be used as alternatives, or in addition. Intuitively, for maximizing downlink throughput to the UEs, the "stronger" UEs preferably are to be co-scheduled, whereas the "weaker" UEs are more likely to be scheduled using SU-MIMO.

The first table 600 has a total of 16 entries 602 of panel-to-UE assignment, and each assignment lists a specific mapping of the panels assigned to transmit to a selection of the UEs. For example, the first entry 602a lists all 4 panels are assigned to transmit to only one UE (having the index "4"), whereas the eighth entry 602b lists "Panel 1" is assigned to transmit to the UE having the index "1" with all of "Panels 2-4" assigned to transmit to the UE having the index "3", while the sixteenth entry 602c lists "Panel 1" is assigned to transmit to the UE having the index "1", "Panels 2-3" are assigned to transmit to the UE having the index "2", and "Panel 4" is assigned to transmit to the UE having the index "4".

In this example, the first table 600 may be obtained using computer simulations, based on a propagation channel model (e.g. 3GPP channel models like 3D-urban micro (Umi), 3D-urban macro (Uma), and etc.), and the likely (or probable) frequency of usage (i.e. depicted by column 604 of the table 600) of each panel-to-UE assignment by the network entity for scheduling is generated through the simulations. For instance, the first entry 602a, the eighth entry 602b, and the sixteenth entry 602c respectively have respective probable frequencies of usage of 36.43%, 2.35% and 0.75%. Together, the top 8 entries 602 have a probable combined frequency of usage of about 84.765%, and all the 16 entries 602 have a probable combined frequency of usage of about 96.563%, as depicted in row 606 of the first table 600.

It is to be appreciated that the top N entries (e.g. N=8 or 16) of the first table 600 are selected, based on a desired percentage through simulating a wide range of UE distributions in a cell and various envisaged group allocations. N is defined as an allowed number of candidate sets based on computing limitations (e.g. GPU speed or computing power of a computing platform on which the simulations are carried out). While the simulations may not necessarily cover close to 100% of all possible optimal choices, the overall system performance of the network entity that can be obtained using those N entries for scheduling is considered substantially similar to in the case of doing an exhaustive search (of all possible combinations of panel-to-UE assignment, i.e. $U^P$), since the PF scheduler dynamically self-adjusts to the different simulating conditions, as long as very good competing choices of panel-to-UE assignment are present.

It is also to be appreciated that since channel statistics do not tend to change considerably from panel to panel, permutations of beam assignments to the panels may be eliminated, and thus disregarded for arriving at the reduced set. Moreover, insights attained from observations of scheduling behaviour in (prior) simulations may also be used in conjunction with intuition for maximizing cell performance to further refine the reduced set (e.g. smart learning algorithms may be used to derive the reduced set for a particular system configuration and UE distribution). For instance, a supervised learning algorithm using neural network, based on offline training, may be utilized for this purpose. Data from offline simulations may be used to predict the reduced set, based on large and small scale fading of a group of UEs of interest. Alternatively, online optimization may be performed, by first starting with a larger reduced set for initial iterations, and further refining the initial reduced set, based on the frequency of selected entries.

As an example, with each operation of process 420 of FIG. 4, the network entity may count the panel-to-UE assignment combinations that were deemed to have the highest PF metric and therefore selected for scheduling. These may be counted and, over many operations, the frequency of assignment of each combination can be determined. New frequencies can be substituted for those in FIGS. 6*a*, and 6*b* (as well as those in FIGS. 7*a*, 7*b*, 8*a* and 8*b* described below), and a different rank-order of panel-to-UE assignment combinations can be used thereafter.

In order to not restrict the possible combinations to the original set, new combinations from the complete set of possible combinations, can be entered in the reduced set. For example, the bottom-most entry (or the bottommost 2, 3 or 4 entries) can be substituted with entries lower down the complete list. In this way, if there are entries that were deemed by computer simulations to be less likely but, in practice, turn out to be more likely, they can rise higher in the ranking, and subsequently be included in the reduced set.

Certain observations may be made in respect of the entries 620 in the first table 600: (1). "stronger" UEs are typically co-scheduled together; (2) "stronger" UEs may also be co-scheduled with "weaker" UEs; (3). "stronger" UEs are usually assigned fewer panels when paired with "weaker" UEs; and (4). "weaker" UEs are typically scheduled for SU-MIMO transmissions.

FIGS. 7*a* and 7*b* depict respective tables 700, 720 for reduced sets of panel-to-UE assignment, in accordance with a second aspect of the present disclosure. The tables 700, 720 of the second aspect are to be understood in a similar manner, as afore described for the first table 600 of FIG. 6*a*.

FIGS. 8*a* and 8*b* depict respective tables 800, 820 for reduced sets of panel-to-UE assignment, in accordance with a third aspect of the present disclosure. The tables 800, 820 of the third aspect are also to be understood in a similar manner, as afore described for the first table 600 of FIG. 6*a*. It is to be appreciated that for this aspect, the tables 800, 820 are each instead configured with a total of 8 entries 802, 804 of panel-to-UE assignment. It is appreciated that a lesser number of entries (in a table) in turn beneficially facilitate faster searching by the network entity, thereby improving overall efficiency of operation.

Figure 9:
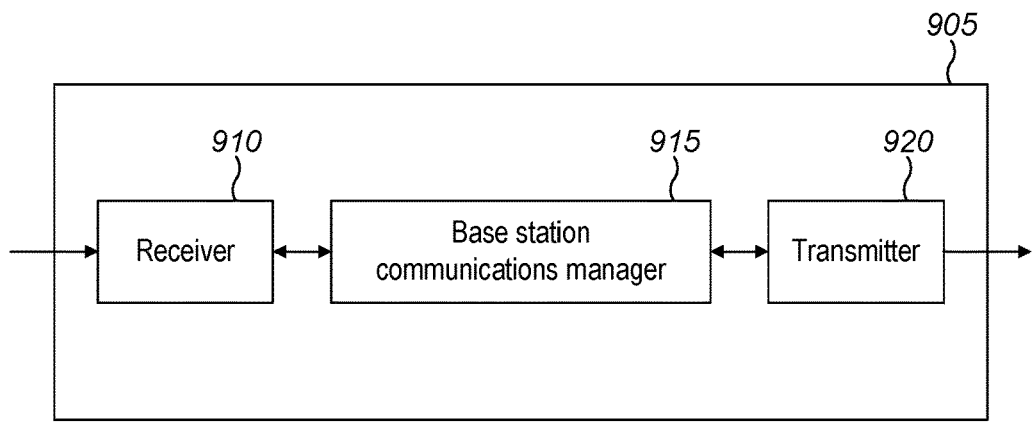
FIGS. 9 and 10 are block diagrams of devices that support scheduling MU-MIMO transmissions to a co-scheduled set of UEs from an antenna array, in accordance with aspects of the present disclosure.

FIG. 9 is block diagram of a device 905 that supports scheduling MU-MIMO transmissions to a co-scheduled set of UEs from an antenna array (comprising multiple panels), in accordance with aspects of the present disclosure. The device 905 may be an example of aspects of a network entity 105. The device 905 may include a receiver 910, a base station communications manager 915, and a transmitter 920. The base station communications manager 915 can be implemented, at least in part, by one or both of a modem and a processor. Each of these components may be in communication with one another (e.g. via one or more buses).

The receiver 910 may receive information such as packets, user data, or control information associated with various information channels (e.g. control channels, data channels, or information related to signals for scheduling MU-MIMO transmissions to a co-scheduled set of UEs from an antenna array). Information may be passed on to other components of the device 905. The receiver 910 may be an example of aspects of the transceiver 1220 described with reference to FIG. 12. The receiver 910 may utilize a single antenna or a set of antennas (e.g. for MIMO communications).

The base station communications manager 915 may determine a reduced set of entries of panel-to-UE assignment from among multiple combinations of panel-to-UE assignment; and may select, from within the reduced set, an entry of the panel-to-UE assignment for scheduling, based on a PF metric. The base station communications manager 915 is an implementation of the MU-MIMO scheduler. The base station communications manager 915 may be an example of aspects of the base station communications manager 1210 described herein with reference to FIG. 12.

The transmitter 920 may transmit signals generated by other components of the device 905. In some examples, the transmitter 920 may be collocated with a receiver 910 in a transceiver component. For example, the transmitter 920 may be an example of aspects of the transceiver 1220 described with reference to FIG. 12. The transmitter 920 may utilize a single antenna or a set of antennas (e.g. for MIMO communications).

Figure 10:
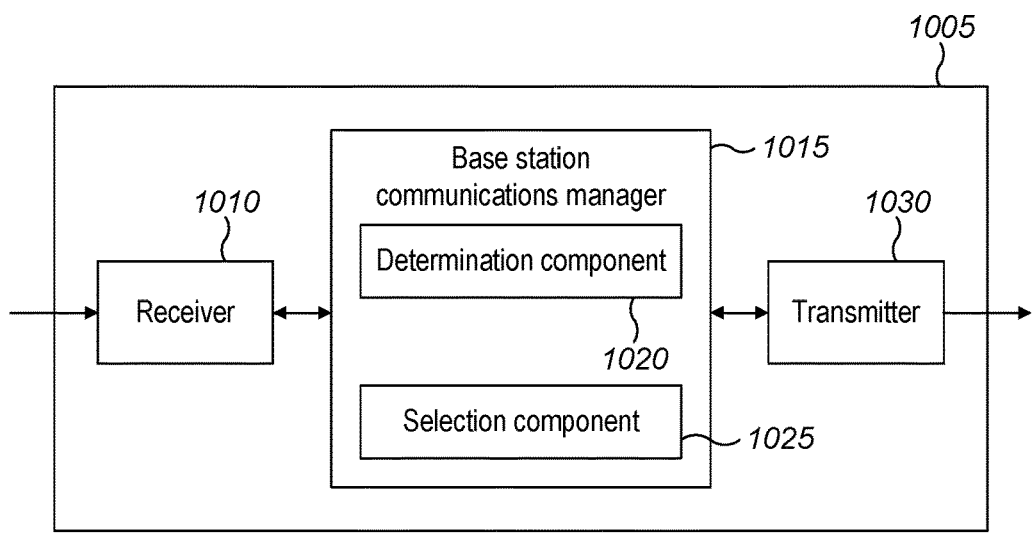

FIG. 10 is block diagram of a device 1005 that supports scheduling MU-MIMO transmissions to a co-scheduled set of UEs from an antenna array (with multiple antenna panels), in accordance with aspects of the present disclosure. The device 1005 may be an example of aspects of a device 905, or a network entity 105. The device 1005 may include a receiver 1010, a base station communications manager 1015, and a transmitter 1030. The base station communications manager 1015 can be implemented, at least in part, by one or both of a modem and a processor. Each of these components may be in communication with one another (e.g. via one or more buses).

The receiver 1010 may receive information such as packets, user data, or control information associated with various information channels (e.g. control channels, data channels, or information related to signals for scheduling MU-MIMO transmissions to a co-scheduled set of UEs from an antenna array). Information may be passed on to other components of the device 1005. The receiver 1010 may be an example of aspects of the transceiver 1220 described with reference to FIG. 12. The receiver 1010 may utilize a single antenna or a set of antennas (e.g. for MIMO communications).

The base station communications manager 1015 may include a determination component 1020 and a selection component 1025. The base station communications manager 1015 is an implementation of the MU-MIMO scheduler.

The determination component 1020 may determine a reduced set of entries of panel-to-UE assignment from among multiple combinations of panel-to-UE assignment. The selection component 1025 may select, from within the reduced set, an entry of the panel-to-UE assignment for scheduling, based on a PF metric.

The transmitter 1030 may transmit signals generated by other components of the device 1005. In some examples, the transmitter 1030 may be collocated with the receiver 1010 in a transceiver component. For example, the transmitter 1030 may be an example of aspects of the transceiver 1220 described with reference to FIG. 12. The transmitter 1030 may utilize a single antenna or a set of antennas (e.g. for MIMO communications).

Figure 11:
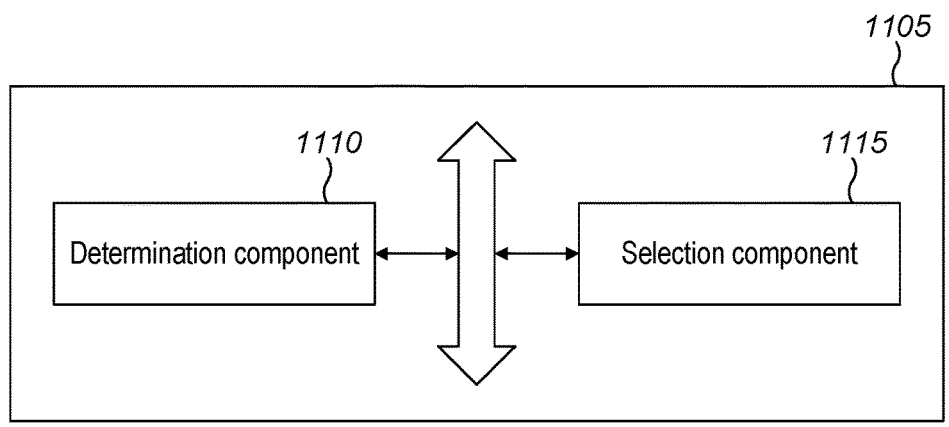
FIG. 11 is a block diagram of a communications manager that supports scheduling MU-MIMO transmissions to a co-scheduled set of UEs from an antenna array, in accordance with aspects of the present disclosure.

FIG. 11 is a block diagram of a communications manager 1105 that supports scheduling MU-MIMO transmissions to a co-scheduled set of UEs from an antenna array, in accordance with aspects of the present disclosure. The communications manager 1105 may be an example of aspects of a base station communications manager 915, a base station communications manager 1015, or a base station communications manager 1210 described herein. The communications manager 1105 may include a determination component 1110, and a selection component 1115. Each of these components may communicate, directly or indirectly, with one another (e.g. via one or more buses). The communications manager 1105 is an implementation of the MU-MIMO scheduler.

The determination component 1110 may determine a reduced set of entries of panel-to-UE assignment from among multiple combinations of panel-to-UE assignments.

The selection component 1115 may select, from within the reduced set, an entry of the panel-to-UE assignment for scheduling, based on a PF metric.

Figure 12:
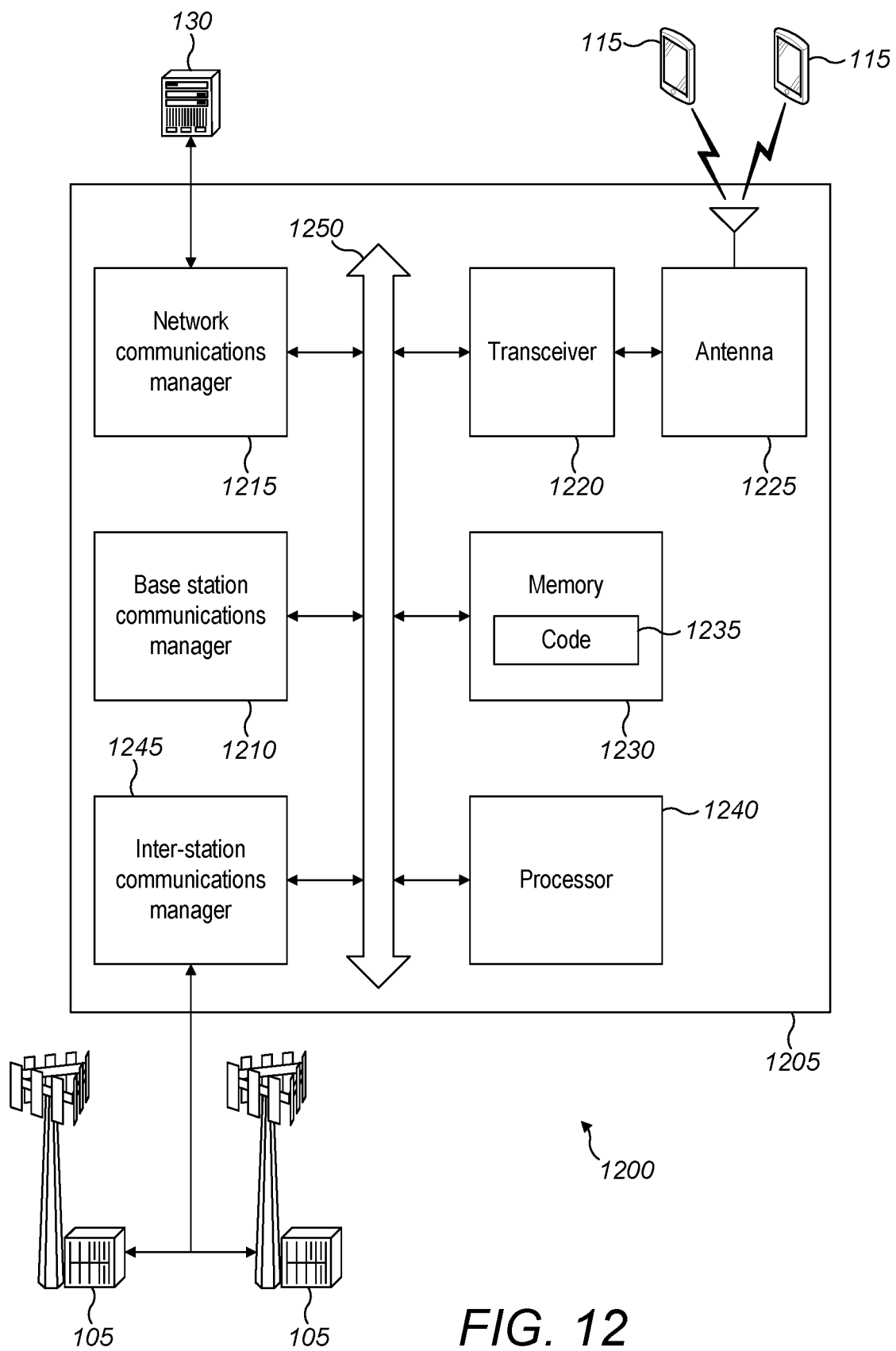
FIG. 12 is a diagram of a system including a device that supports scheduling MU-MIMO transmissions to a co-scheduled set of UEs from an antenna array, in accordance with aspects of the present disclosure.

FIG. 12 is a diagram of a system 1200 including a device 1205 that supports scheduling MU-MIMO transmissions to a co-scheduled set of UEs from an antenna array, in accordance with aspects of the present disclosure. The device 1205 may be an example of, or include the components of device 905, device 1005, or a network entity 105. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g. bus 1250).

The base station communications manager 1210 may determine a reduced set of entries of panel-to-UE assignment from among multiple combinations of panel-to-UE assignment; and may select, from within the reduced set, an entry of the panel-to-UE assignment for scheduling, based on a PF metric.

The network communications manager 1215 may manage communications with the core network (e.g. via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some implementations, the device 1205 may include a single antenna 1225. However, in some implementations the device 1205 may have more than one antenna 1225, which may be capable of concurrently transmitting or receiving multiple wireless transmissions (e.g. for MIMO communications). More specifically, the multiple antennas 1225 may be implemented in the form of an antenna array, which is arranged to include multiple panels, according to an exemplary aspect. Each antenna panel may be configured with 2 digitally controlled radio-frequency (RF) chains.

The memory 1230 may include RAM, ROM, or a combination thereof. The memory 1230 may store computer-readable code 1235 including instructions that, when executed by a processor (e.g. the processor 1240) cause the device to perform various functions described herein. In some implementations, the memory 1230 may contain, among other things, a BIOS which may control basic hardware or software operation such as the interaction with peripheral components or devices.

The processor 1240 may include an intelligent hardware device, (e.g. a general-purpose processor, a DSP, a CPU, a microcontroller, an ASIC, an FPGA, a programmable logic device, a discrete gate or transistor logic component, a discrete hardware component, or any combination thereof). In some implementations, the processor 1240 may be configured to operate a memory array using a memory controller. In some implementations, a memory controller may be integrated into processor 1240. The processor 1240 may be configured to execute computer-readable instructions stored in a memory (e.g. the memory 1230) to cause the device 1205 to perform various functions (e.g. functions or tasks supporting scheduling MU-MIMO transmissions to a co-scheduled set of UEs from an antenna array).

The inter-station communications manager 1245 may manage communications with other network entity 105, and may include a controller or scheduler for controlling communications with UEs 115 in cooperation with other network entities 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between network entities 105.

The computer-readable code 1235 may include instructions to implement aspects of the present disclosure, including instructions to support scheduling MU-MIMO transmissions to a co-scheduled set of UEs from an antenna array. The computer-readable code 1235 may be stored in a non-transitory computer-readable medium such as system memory or other type of memory. In some implementations, the computer-readable code 1235 may not be directly executable by the processor 1240 but may cause a computer (e.g. when compiled and executed) to perform functions described herein.

Figure 13:
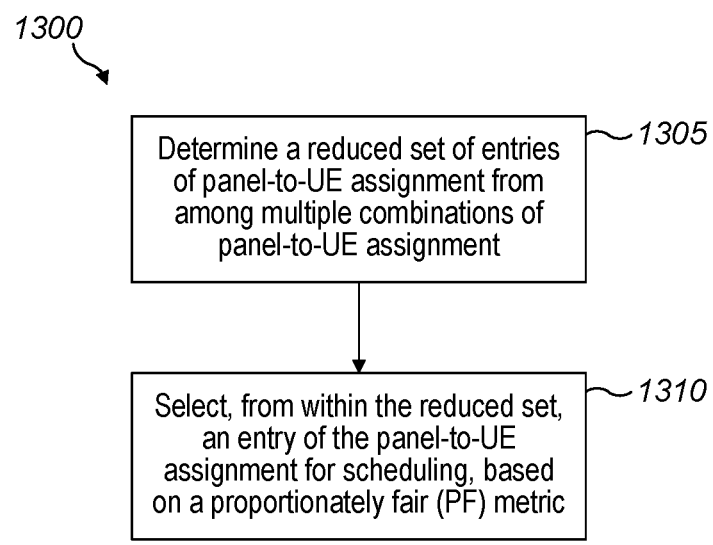
FIG. 13 is a flowchart illustrating a method for scheduling MU-MIMO transmissions to a co-scheduled set of UEs from an antenna array, in accordance with aspects of the present disclosure.

FIG. 13 is a flowchart illustrating a method 1300 that supports scheduling MU-MIMO transmissions to a co-scheduled set of UEs from an antenna array, in accordance with aspects of the present disclosure. The operations of method 1300 may be implemented by a network entity 105 or its components. For example, the operations of method 1300 may be performed by a base station communications manager as described with reference to FIGS. 9-12. In some examples, a network entity 105 may execute a set of instructions to control the functional elements of the network entity 105 to perform the functions described below. Additionally or alternatively, a network entity 105 may perform aspects of the functions described below using special-purpose hardware.

At 1305, the network entity 105 may determine a reduced set of entries of panel-to-UE assignment from among multiple combinations of panel-to-UE assignment. The operations of 1305 may be performed according to the methods described herein. In some examples, aspects of the operations of 1305 may be performed by a determination component as described with reference to FIGS. 10-11.

At 1310, the network entity 105 may select, from within the reduced set, an entry of the panel-to-UE assignment for scheduling, based on a PF metric. The operations of 1310 may be performed according to the methods described herein. In some examples, aspects of the operations of 1310 may be performed by a selection component as described with reference to FIGS. 10-11.

In some implementations, the operations of the method 1300 may be programmed into, and stored as corresponding computer-readable code 1235.

All of the methods described herein describe possible implementations, and that the operations and the steps may be rearranged or otherwise modified and that other implementations are possible. Further, aspects from two or more of the methods, if applicable, may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (such as, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on".

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples". The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but to be accorded the broadest scope consistent with the principles and novel features disclosed herein.

The invention claimed is:

1. An apparatus, at a network entity, for scheduling multi-user multiple-input multiple-output (MU-MIMO) transmissions to a co-scheduled set of user equipment (UEs) from an antenna array comprising multiple panels, comprising:
at least one processor;
at least one memory communicatively coupled to the processor; and
executable instructions code stored in the at least one memory, which when executed by the at least one processor, cause the at least one processor to:
determine a reduced set of entries of panel-to-UE assignment from among multiple combinations of panel-to-UE assignment; and
select, from within the reduced set, an entry of the panel-to-UE assignment for scheduling, based on a proportionately fair (PF) metric of the entry of the panel-to-UE assignment,
wherein a panel-to-UE assignment is a mapping of the multiple panels assigned to transmit to a selection of the UEs using associated serving beams configured for transmission to the respective UEs.

2. The apparatus of claim 1, wherein to select the entry of the panel-to-UE assignment for scheduling comprises to:
compute PF metrics for the respective entries in the reduced set of the panel-to-UE assignment;
select, from the reduced set, an entry having a maximum value for the computed PF metric as the selected entry of the panel-to-UE assignment for scheduling; and
schedule, based on the selected entry, a MU-MIMO transmission in a next transmission time interval (TTI).

3. The apparatus of claim 2, wherein to compute the PF metrics for the respective entries in the reduced set comprises to:
perform, for each entry in the reduced set, the following steps:
compute, based on estimated wideband instantaneous throughput and average throughput for each UE in the entry, PF metrics for the respective UEs in the entry; and
sum the respective computed PF metrics to obtain a summed PF metric for the entry.

4. The apparatus of claim 3, wherein the summed PF metric is based on:

$$SumPF = \sum_i PF(i),$$

wherein SumPF is the summed PF metric, and PF(i) is the computed PF metric for the i-th UE; and
wherein a PF metric of a UE is based on the equation:

$$PF(i) = \frac{R_i^\alpha}{\overline{R}_i^\beta},$$

wherein $R_i^\alpha$ is an estimated instantaneous throughput for the i-th UE, $\overline{R}_i$ is an average throughput of the i-th UE, and $\alpha$ and $\beta$ are parameters configured to tradeoff between fairness and the average throughput.

5. The apparatus of claim 3, wherein the executable instructions code, when executed by the at least one processor, further cause the at least one processor to:
determine, for each entry in the reduced set, respective representations of a full radio channel at respective UEs in the entry to thereby obtain respective precoded composite channel representations at the respective UEs in the entry,
wherein the determinations are based on the panel-to-UE assignment associated with the entry, the associated serving beams configured for the respective UEs in the entry, and a digital precoder selected for the respective UEs in the entry configured to maximize signal strength and mitigate inter-UE interference.

6. The apparatus of claim 5, wherein the executable instructions code, when executed by the at least one processor, further cause the at least one processor to:
compute, for each entry in the reduced set, channel quality indicators associated with respective data streams to be transmitted by the respective serving beams,
wherein the computation is based at least on the precoded composite channel representations; and
wherein the estimated wideband instantaneous throughput are computed based on the computed channel quality indicators.

7. The apparatus of claim 6, wherein the executable instructions code, when executed by the at least one processor, further cause the at least one processor to:
perform, for each entry in the reduced set, rank adaption for ranks of the respective UEs in the entry, which is made based on the assignment of the panels in the entry.

8. The apparatus of claim 1, wherein to determine the reduced set of entries of the panel-to-UE assignment includes to predetermine the reduced set of entries of the panel-to-UE assignment based on computer simulations.

9. The apparatus of claim 1, wherein the executable instructions code, when executed by the at least one processor, further cause the at least one processor to:
order, based on indexes, the UEs in descending order,
wherein the indexes are generated based on reference signals received power (RSRP) detected at the respective UEs, or based on measurement of respective sounding reference signals (SRS) from the respective UEs.

10. The apparatus of claim 1, wherein the executable instructions code, when executed by the at least one processor, further cause the at least one processor to:
order, based on indexes, the UEs in ascending order,
wherein the indexes are generated based on individual UE PF metrics computed for the respective UEs configured under single-user (SU) transmission.

11. The apparatus of claim 1, wherein the executable instructions code, when executed by the at least one processor, further cause the at least one processor to:
perform, prior to the selection, channel sounding for each UE in the set of UEs, which includes:
performing, for each serving beam of serving beams of the associated serving beams configured for transmission to the respective UEs, the following step:
receiving, from the set of UEs, respective sounding reference signals (SRSs) transmitted on an associated SRS resource.

12. The apparatus of claim 11, wherein the respective SRSs are transmitted by the respective UEs on respective different frequency resources.

13. A method performed, at a network entity, for scheduling multi-user multiple-input multiple-output (MU- MIMO) transmissions to a co-scheduled set of user equipment (UEs) from an antenna array comprising multiple panels, comprising:
  determining a reduced set of entries of panel-to-UE assignment from among multiple combinations of panel-to-UE assignment; and
  selecting, from within the reduced set, an entry of the panel-to-UE assignment for scheduling, based on a proportionately fair (PF) metric of the entry of the panel-to-UE assignment,
  wherein a panel-to-UE assignment is a mapping of the multiple panels assigned to transmit to a selection of the UEs using associated serving beams configured for transmission to the respective UEs.

14. The method of claim 13, wherein selecting the entry of the panel-to-UE assignment for scheduling comprises:
  computing PF metrics for the respective entries in the reduced set of the panel-to-UE assignment;
  selecting, from the reduced set, an entry having a maximum value for the computed PF metric as the selected entry of the panel-to-UE assignment for scheduling; and
  scheduling, based on the selected entry, a MU-MIMO transmission in a next transmission time interval (TTI).

15. The method of claim 14, wherein computing the PF metrics for the respective entries in the reduced set comprises:
  performing, for each entry in the reduced set, the following steps:
    computing, based on estimated wideband instantaneous throughput and average throughput for each UE in the entry, PF metrics for the respective UEs in the entry; and
    summing the respective computed PF metrics to obtain a summed PF metric for the entry.

16. The method of claim 15, wherein the summed PF metric is based on:

$$SumPF = \sum_i PF(i),$$

wherein SumPF is the summed PF metric, and PF(i) is the computed PF metric for the i-th UE; and
wherein a PF metric of a UE is based on the equation:

$$PF(i) = \frac{R_i^\alpha}{\overline{R}_i^\beta},$$

wherein $R_i^\alpha$ is an estimated instantaneous throughput for the i-th UE, $\overline{R}_i$ is an average throughput of the i-th UE, and $\alpha$ and $\beta$ are parameters configured to tradeoff between fairness and the average throughput.

17. The method of claim 15, further comprises:
determining, for each entry in the reduced set, respective representations of a full radio channel at respective UEs in the entry to thereby obtain respective precoded composite channel representations at the respective UEs in the entry,
wherein the determinations are based on the panel-to-UE assignment associated with the entry, the associated serving beams configured for the respective UEs in the entry, and a digital precoder selected for the respective UEs in the entry configured to maximize signal strength and mitigate inter-UE interference.

18. The method of claim 17, further comprises:
computing, for each entry in the reduced set, channel quality indicators associated with respective data streams to be transmitted by the respective serving beams,
wherein the computation is based at least on the precoded composite channel representations; and
wherein the estimated wideband instantaneous throughput are computed based on the computed channel quality indicators.

19. The method of claim 18, further comprises:
performing, for each entry in the reduced set, rank adaption for ranks of the respective UEs in the entry, which is made based on the assignment of the panels in the entry.

20. The method of claim 13, wherein determining the reduced set of entries of the panel-to-UE assignment includes predetermining the reduced set of entries of the panel-to-UE assignment based on computer simulations.

21. The method of claim 13, further comprises:
ordering, based on indexes, the UEs in descending order,
wherein the indexes are generated based on reference signals received power (RSRP) detected at the respective UEs, or based on measurement of respective sounding reference signals (SRS) from the respective UEs.

22. The method of claim 13, further comprises:
ordering, based on indexes, the UEs in ascending order,
wherein the indexes are generated based on individual UE PF metrics computed for the respective UEs configured under single-user (SU) transmission.

23. The method of claim 13, further comprises:
performing, prior to the selection, channel sounding for each UE in the set of UEs, which includes:
  performing, for each serving beam of the associated serving beams configured for transmission to the respective UEs, the following step:
    receiving, from the set of UEs, respective sounding reference signals (SRSs) transmitted on an associated SRS resource.

24. The method of claim 23, wherein the respective SRSs are transmitted by the respective UEs on respective different frequency resources.

25. An apparatus, at a network entity, for scheduling multi-user multiple-input multiple-output (MU-MIMO) transmissions to a co-scheduled set of user equipment (UEs) from an antenna array comprising multiple panels, comprising:
  means for determining a reduced set of entries of panel-to-UE assignment from among multiple combinations of panel-to-UE assignment; and
  means for selecting, from within the reduced set, an entry of the panel-to-UE assignment for scheduling, based on a proportionately fair (PF) metric of the entry of the panel-to-UE assignment,
  wherein a panel-to-UE assignment is a mapping of the multiple panels assigned to transmit to a selection of the UEs using associated serving beams configured for transmission to the respective UEs.

26. The apparatus of claim 25, wherein the means for selecting the entry of the panel-to-UE assignment for scheduling comprises:
  means for computing PF metrics for the respective entries in the reduced set of the panel-to-UE assignment;

means for selecting, from the reduced set, an entry having a maximum value for the computed PF metric as the selected entry of the panel-to-UE assignment for scheduling; and means for scheduling, based on the selected entry, a MU-MIMO transmission in a next transmission time interval (TTI).

27. The apparatus of claim 26, wherein the means for computing the PF metrics for the respective entries in the reduced set comprises:

means for performing, for each entry in the reduced set, the following steps:

computing, based on estimated wideband instantaneous throughput and average throughput for each UE in the entry, PF metrics for the respective UEs in the entry; and summing the respective computed PF metrics to obtain a summed PF metric for the entry.

28. The apparatus of claim 27, wherein the summed PF metric is based on:

$$SumPF = \sum_i PF(i),$$

wherein SumPF is the summed PF metric, and PF(i) is the computed PF metric for the i-th UE; and wherein a PF metric of a UE is based on the equation:

$$PF(i) = \frac{R_i^\alpha}{\overline{R}_i^\beta},$$

wherein $R_i^\alpha$ is an estimated instantaneous throughput for the i-th UE, $\overline{R}_i$ is an average throughput of the i-th UE, and $\alpha$ and $\beta$ are parameters configured to tradeoff between fairness and the average throughput.

29. The apparatus of claim 27, further comprises:

means for determining, for each entry in the reduced set, respective representations of a full radio channel at respective UEs in the entry to thereby obtain respective precoded composite channel representations at the respective UEs in the entry, wherein the determinations are based on the panel-to-UE assignment associated with the entry, the associated serving beams configured for the respective UEs in the entry, and a digital precoder selected for the respective UEs in the entry configured to maximize signal strength and mitigate inter-UE interference.

30. A non-transitory computer readable medium comprising executable instructions, which when executed by at least one processor of the apparatus of claim 1, cause the at least one processor to perform the method of claim 13.

\* \* \* \* \*